(12) United States Patent
Gillanders et al.

(10) Patent No.: US 10,076,769 B2
(45) Date of Patent: *Sep. 18, 2018

(54) PROCESSES FOR COATING THE INTERIOR SURFACES OF NONMETAL PIPES

(71) Applicant: Pipe Restoration Technologies, LLC, Santa Ana, CA (US)

(72) Inventors: Larry L. Gillanders, Chilliwack (CA); Steven A. Williams, Stockton, CA (US); Gregory Ryan, Olive Branch, MS (US); John F. Trout, Geneva, IL (US)

(73) Assignee: Pipe Restoration Technologies, LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/863,346

(22) Filed: Jan. 5, 2018

(65) Prior Publication Data

US 2018/0133754 A1    May 17, 2018

Related U.S. Application Data

(62) Division of application No. 15/594,149, filed on May 12, 2017, now Pat. No. 9,889,470, which is a division
(Continued)

(51) Int. Cl.
*B05D 7/22* (2006.01)
*F16L 58/00* (2006.01)
(Continued)

(52) U.S. Cl.
CPC ............ *B05D 7/222* (2013.01); *B05D 3/002* (2013.01); *B05D 3/12* (2013.01); *F16L 58/00* (2013.01);
(Continued)

(58) Field of Classification Search
CPC ......... B05D 7/222; F16L 58/00; F16L 58/02; F16L 58/04
(Continued)

(56) References Cited

U.S. PATENT DOCUMENTS 1,890,164 A    12/1932   Rosenberger
2,087,694 A     7/1937   Malmros
(Continued)

FOREIGN PATENT DOCUMENTS

CA    2198103     3/1996
DE    3821558    12/1989
(Continued)

OTHER PUBLICATIONS

Gillanders, Reexamination U.S. Appl. No. 90/013,528, filed Jul. 6, 2015 for Reexamination of U.S. Pat. No. 7,160,574 Patent Owner's Response to PTO Office Action; Response dated Feb. 9, 2016, 35 pages.
(Continued)

*Primary Examiner* — William P Fletcher, III
(74) *Attorney, Agent, or Firm* — Brian S. Steinberger; Law Offices of Brian S. Steinberger, P.A.

(57) ABSTRACT

Methods and systems for providing cleaning and providing barrier coatings to interior wall surfaces of small diameter nonmetal and composite piping systems in buildings, swimming pools, underground pipes, in-slab piping systems, piping under driveways and various liquid transmission lines. An entire piping system can be cleaned in one single pass by dry particulates forced by air throughout the building piping system by an external generator, and the entire piping system can be coated in one single pass by a machine connected exterior to the piping system. Small pipes can be protected by the effects of water corrosion, erosion and electrolysis, extending the life of piping systems such as
(Continued)

6 General Process Steps plastics, PVC (polyvinyl chloride), composite materials, polybutylene. Coatings can be applied to pipes having diameters of approximately ⅜" up to approximately 6" so that entire piping systems such as potable water lines, natural gas lines, HVAC piping systems, drain lines, and fire sprinkler systems in single-family homes to apartments to high-rise hotel/resort facilities and office towers, apartment and condominium buildings and schools, can be cleaned and coated to pipes within existing walls. The coating forms at least a 4 mils or greater covering inside of pipes. Buildings can return to service within approximately 24 to approximately 96 hours.

20 Claims, 13 Drawing Sheets

Related U.S. Application Data of application No. 15/254,324, filed on Sep. 1, 2016, now Pat. No. 9,744,561, which is a division of application No. 14/324,455, filed on Jul. 7, 2014, now Pat. No. 9,446,429, which is a division of application No. 13/210,659, filed on Aug. 16, 2011, now Pat. No. 8,887,660, which is a division of application No. 12/947,012, filed on Nov. 16, 2010, now Pat. No. 8,354,140, which is a division of application No. 12/378,670, filed on Feb. 18, 2009, now Pat. No. 8,206,783, which is a division of application No. 11/246,825, filed on Oct. 7, 2005, now Pat. No. 7,517,409, which is a division of application No. 10/649,288, filed on Aug. 27, 2003, now Pat. No. 7,160,574.

(60) Provisional application No. 60/406,602, filed on Aug. 28, 2002.

(51) Int. Cl.
F16L 58/02 (2006.01)
F16L 58/04 (2006.01)
B05D 3/12 (2006.01)
F16L 58/10 (2006.01)
B05D 3/00 (2006.01)
F16L 101/10 (2006.01)

(52) U.S. Cl.
CPC .............. F16L 58/02 (2013.01); F16L 58/04 (2013.01); F16L 58/1009 (2013.01); B05D 2254/04 (2013.01); F16L 2101/10 (2013.01); Y10S 118/10 (2013.01); Y10S 118/13 (2013.01)

(58) Field of Classification Search
USPC ........................................................ 427/230
See application file for complete search history.

(56) References Cited

U.S. PATENT DOCUMENTS

| 2,298,775 | A | 10/1942 | Raiche |
| 2,331,824 | A | 10/1943 | Buckingham |
| 2,497,021 | A | 2/1950 | Sterns |
| 3,139,704 | A | 7/1964 | McCune |
| 3,139,711 | A | 7/1964 | Soderberg, Jr. |
| 3,151,418 | A | 10/1964 | Powell et al. |
| 3,286,406 | A | 11/1966 | Ashworth |
| 3,287,148 | A | 11/1966 | Hilbush, Jr. |
| 3,382,892 | A | 5/1968 | Cerbin |
| 3,385,587 | A | 5/1968 | Smith |
| 3,440,400 | A | 4/1969 | Cotts |
| 3,485,671 | A | 12/1969 | Stephens |
| 3,608,249 | A | 9/1971 | Sullivan |
| 3,727,412 | A | 4/1973 | Marx et al. |
| 3,835,587 | A | 9/1974 | Hall, Jr. |
| 3,925,576 | A | 12/1975 | Hendrix |
| 4,005,549 | A | 2/1977 | Perry |
| 4,117,308 | A | 9/1978 | Boggs et al. |
| 4,177,308 | A | 12/1979 | Beeler |
| 4,246,148 | A | 1/1981 | Shimp et al. |
| 4,255,468 | A | 3/1981 | Olson |
| 4,311,409 | A | 1/1982 | Stang |
| 4,314,427 | A | 2/1982 | Stoltz |
| 4,327,132 | A | 4/1982 | Shinno |
| 4,333,277 | A | 6/1982 | Tasedan |
| 4,454,173 | A | 6/1984 | Koga |
| 4,454,174 | A | 6/1984 | Koga |
| 4,505,613 | A | 3/1985 | Koga |
| 4,576,596 | A | 3/1986 | Jackson et al. |
| 4,579,596 | A | 4/1986 | Murzyn |
| 5,007,461 | A | 4/1991 | Naf |
| 5,017,258 | A | 5/1991 | Brown et al. |
| 5,045,352 | A | 9/1991 | Mueller |
| 5,046,289 | A | 9/1991 | Bengel et al. |
| 5,085,016 | A | 2/1992 | Rose |
| 5,192,816 | A | 3/1993 | Iizuka |
| 5,231,804 | A | 8/1993 | Abbott |
| 5,460,563 | A | 10/1995 | McQueen, Jr. |
| 5,499,659 | A | 3/1996 | Naf |
| 5,544,859 | A | 8/1996 | Coltrinari et al. |
| 5,622,209 | A | 4/1997 | Naf |
| 5,643,057 | A | 7/1997 | Isaacson |
| 5,707,702 | A | 1/1998 | Brady, Jr. et al. |
| 5,800,629 | A | 9/1998 | Ludwig et al. |
| 5,915,395 | A | 6/1999 | Smith |
| 5,924,913 | A | 7/1999 | Reimelt |
| 5,936,022 | A | 8/1999 | Freeman |
| 5,950,681 | A | 9/1999 | Reimelt |
| 6,316,016 | B1 | 11/2001 | Iwakawa |
| 6,345,632 | B1 | 2/2002 | Ludwig et al. |
| 6,397,895 | B1 | 6/2002 | Lively |
| 6,423,152 | B1 | 7/2002 | Landaas |
| 6,739,950 | B1* | 5/2004 | Kruse ................... B05D 7/222 |
| | | | 451/28 |
| 7,041,176 | B2 | 5/2006 | Kruse |
| 7,066,730 | B2 | 6/2006 | MacAluso |
| 7,160,574 | B1 | 1/2007 | Gillanders et al. |
| 7,270,847 | B2 | 9/2007 | Horn |
| 7,517,409 | B1 | 4/2009 | Gillanders et al. |
| 7,605,195 | B1 | 10/2009 | Ward et al. |
| 7,771,542 | B1 | 8/2010 | Hunt et al. |
| 7,858,149 | B2 | 12/2010 | Gillanders et al. |
| 8,343,579 | B2 | 1/2013 | Gillanders |
| 8,486,314 | B1 | 7/2013 | Terry et al. |
| 8,524,320 | B1 | 9/2013 | Gillanders |
| 8,696,823 | B1 | 4/2014 | Gillanders |
| 8,795,768 | B2 | 8/2014 | Gillanders |
| 8,887,660 | B2 | 11/2014 | Gillanders et al. |
| 8,895,905 | B2 | 11/2014 | Gillanders |
| 9,273,815 | B2 | 3/2016 | Gillanders |
| 9,352,357 | B2 | 5/2016 | Gillanders et al. |
| 9,446,429 | B2 | 9/2016 | Gillanders et al. |
| 9,555,453 | B2 | 1/2017 | Gillanders et al. |
| 9,611,973 | B2 | 4/2017 | Gillanders et al. |
| 9,724,730 | B2 | 8/2017 | Gillanders et al. |
| 9,744,561 | B2 | 8/2017 | Gillanders et al. |
| 9,889,470 | B2* | 2/2018 | Gillanders ............. B05D 7/222 |
| 2004/0132387 | A1 | 7/2004 | Cruse |
| 2004/0163684 | A1 | 8/2004 | Hapke |
| 2007/0128353 | A1 | 6/2007 | Gillanders et al. |
| 2010/0047439 | A1 | 2/2010 | Gillanders et al. |
| 2012/0273078 | A1 | 11/2012 | Hawwa et al. |
| 2016/0296972 | A1 | 10/2016 | Gillanders et al. |

FOREIGN PATENT DOCUMENTS

| DE | 4404473 | 9/1995 |
| EP | 0299134 | 2/1988 |
| EP | 0393433 | 4/1990 |
| EP | 0551790 | 7/1993 |
| EP | 0634229 | 7/1994 |

(56) References Cited

FOREIGN PATENT DOCUMENTS

| | | | |
|---|---|---|---|
| EP | 0637737 | | 7/1994 |
| EP | 0634229 A1 * | | 1/1995 ........... B08B 9/0323 |
| EP | 1674495 | | 6/2006 |
| EP | 07716240.2 | | 7/2009 |
| EP | 07716240 | | 6/2011 |
| GB | 2140377 | | 11/1984 |
| JP | 5822662 | | 2/1983 |
| JP | 06126245 | | 5/1994 |
| JP | 3737569 | | 2/1998 |
| RU | 116040 | | 2/1959 |
| WO | PCT/EP1996/001189 | | 10/1996 |
| WO | 2008088317 | | 7/2008 |
| WO | PCT/US07/000072 | | 8/2008 |
| WO | 2009014760 | | 1/2009 |
| WO | 2011040899 | | 4/2011 |

OTHER PUBLICATIONS

Gillanders, Reexamination U.S. Appl. No. 90/013,528, filed Jul. 6, 2015 for Rexamination U.S. Pat. No. 7,160,574, Official Action from PTO dated Apr. 1, 2016, 53 pages.

SSPC—The Society for Protective Coatings and NACE International Standard, Joint Surface Preparation Standard, SSPC-SP 5/NACE No. 1 White Metal Blast Cleaning, copyrighted SSPC: The Society for Protective Coatings, Pittsburg, PA. Sep. 1, 2000, pp. 55-59, 5 pages.

Gillanders, L., U.S. Appl. No. 13/676,784, filed Nov. 14, 2012, Response filed to U.S. Patent Office on Mar. 7, 2014, 41 pages.

Gillanders, L., U.S. Appl. No. 13/676,784, filed Nov. 14, 2012, Notice of Allowance received from the U.S. Patent Office dated Mar. 27, 2014, 13 pages.

Gillanders, L., U.S. Appl. No. 13/676,784, filed Nov. 14, 2012. Response filed to U.S. Patent Office dated Apr. 1, 2014, 80 pages.

Gillanders, L., U.S. Appl. No. 13/676,784, filed Nov. 14, 2012, Office Action Summary received from the U.S. Patent Office dated Apr. 9, 2014, 11 pages.

ACE DuraFlo—The Modern Pipe Renovation System, 2001, online, retrieved on Oct. 20, 2005, retrieved from Http://web.archive,org/web/2011021003415/http://aceduraflo.com/index.html. 13 pages.

ACE Duraflo—The Modern Pipe Renovation System, 2001, online, retrieved on Oct. 20, 2005, retrieved from http://web.archive.org/web/2011129000953/http://aceduraflo.com/.index.html, 11 pages.

ACE Duraflo—The Modern Pipe Renovation System, 2001, online, retrieved on Oct. 20, 2005, retrieved from http://web.archive.org/web/20011210171031/http://aceduraflo.com./index.html, 13 pages.

ACE Duraflo—The Modern Pipe Renovation System, 2001, 11 pgs., online, retrieved on Oct. 20, 2005, retrieved from http://www.aceduraflo.com/index.html.

American Pipe Lining, Inc., In-Place Pipe Restoration, date unknown, brochure, 9 pages.

NICITCP Session I Student Handbook, Abrasive Blast Cleaning, Mar. 1992, 6 pages.

Guan, S., PhD and Kennedy H, B. Sc., MBA. A Performance Evaluation of Internal Linings of Municipal Pipe, 1996 North American Corrosion Engineers, Denver, Colorado, 14 pages.

McGovern, M., Can Coatings Protect Wastewaster Treatment Systems? County Sanitation Districts of Los Angeles County tests the sulfuric-acid resistance of 78 products, The Aberdeen Group, 1999, 3 pages.

Warren IC. In Situ Epoxy Resin Lining—Operational Guidelines and Code of Practice. Water Research Centre (WRc), Swindon, UK 1989, 5 pages.

Deb, et al. Service Life Analysis of Water Main Epoxy Lining, AwwaRF, USA, 2006, 18 pages.

Redner, et al., Evaluation of Protective Coatings for Concrete. County Sanitation Districts of Los Angeles, Whittier California, Aug. 1998, 36 pages.

AWWA, American Water Works Assocation. C210-03 Liquid Epoxy Coating Systems for the Interior and Exterior of Steel Water Pipelines, Jun. 1, 2004, Denver, Colorado, 28 pages.

U.S. Army Corps of Engineers, In Situ Epoxy Coating for Metallic Pipe Guidance, Public Works Technical Bulletin 420-49-35, 2001, U.S. Army Corps of Engineers, Washington, D.C., 32 pages.

Boyd et. al., Lead Pipe Rehabilitation and Replacement Techniques for Drinking Water Service: Review of Available and Emerging Technologies, Trenchless Tech, 2001, pp. 13-24, vol. 15, No. 1, 12 pages.

Brady, Licensing Agreement between American Pipe Lining, Inc. and U.S. Navy, Aug. 1996, 19 pages.

ABSS Visual Comparator Guide Degrees of Cleanliness, Sep. 9, 2013, 1 page.

Patentees response to Reexam serial No. 95/001,717 filed on Feb. 2, 2012, 79 pages.

3rd party requesters response to Reexam serial No. 95/001,717 filed Sep. 13, 2011, 56 pages.

Interparty Reexam, Serial No. 95/001,717 filed Aug. 17, 2011, 137 pages.

American Pipe Lining, Inc., In-Place Pipe Restoration, 2001, 11 pgs, online, retrieved on Oct. 25, 2005, retrieved from http://web.archive.org/web20010801213356/www.ampipelining.com/index.html, 12 pages.

ACE DuraFlo—The Modem Pipe Renovation System, 2001, online, retrieved on Oct. 20, 2005, retrieved from http://web.archive.org/web/2011021003415/http://aceduraflo.com/index.html, 13 pages.

ACE DuraFlo Dust Collector Service Manual, ACE DuraFlo Systems, LLC, 2001, Manual, 6 pages.

Brady, Fact Sheet from the Navy Pollution Prevention Conference on the Restoration of Drinking Water Piping with Nontoxic Epoxy Linings, 1995, Navy Pollution Prevention Conference, Arlington, VA, EnviroSense, 4 pages.

Brady, et. al., Epoxy Lining for Shipboard Piping Systems, Materials Chemistry Branch, Chemistry Division, NRL/MR/6120-94-7629, 1994, 29 pages.

Demboski, et. al., Evolutions in U.S. Navy Shipboard Sewage and Graywater Programs, retrieved on Sep. 3, 2014, 16 pages.

Gillanders, U.S. PCT Patent Application No. PCT/US09/05514 filed Oct. 7, 2009, International Search Report dated Apr. 13, 2010, 4 pages.

Reexamination Request for U.S. Pat. No. 7,160,574 filed Jun. 14, 2015, 11 pages.

Reexamination Request for U.S. Pat. No. 7,160,574 filed Jul. 6, 2015, 90 pages.

Hei, Asaki, Toyo Lining Report Technical Evaluations, Jul. 16, 1981, 57 pages.

Brady, Robert F., Jr., Restoration of Drinking Water Piping With Nontoxic Epoxy Linings, published on Proceedings of the Tree-Service Environment Technology Workshop, "Enhancing Readiness Through Environmental Quality Technology" held in Hershey, PA on the May 20-22, 1996, 6 pages.

Brady, Robert F., Jr., Control of Lead in Drinking Water, Jul. 11, 1997, Naval Research Laboratory, 113 pages.

Information Disclosure Statement (IDS) for Reexamination Request for U.S. Pat. No. 7,160,574 filed Jul. 6, 2015, 2 pages.

Second Reexamination Request for U.S. Pat. No. 8,344,579 filed Jul. 10, 2015, 384 pages.

Gillanders, Appeal No. 2014-001128, Re-Exam Application No. 95/001,717, Re-Exam Filing Date Sep. 13, 2011, U.S. Pat. No. 7,858,149, Patent Owner's Request to Reopen Prosecution Pursuant to 37 C.F.R. 41 77 (b) (1) Filed Feb. 17, 2015, 49 pages.

Gillanders, Re-Exam Application No. 95/001,717, Re-Exam filing date Sep. 13, 2011, U.S. Pat. No. 7,858,149, Information Disclosure Statement by Applicant (Not for Submission under 37 CFR 1.99) filed Feb. 17, 2015, 4 pages.

Gillanders, U.S. Appl. No. 60/406,602, filed Aug. 28, 2002, 40 pages.

Gillanders, U.S. Appl. No. 13/676,784, filed Nov. 14, 2012, Amendment Response filed with PTO on Apr. 25, 2014, 13 pages.

ASTM International, Designation: D4541-02, Standard Test Method for Pull-Off Strength of Coatings Using Portable Adhesion Testers, 2014, 13 pages.

(56) References Cited

OTHER PUBLICATIONS

Gillanders, Re-Exam Application No. 95/001,717, Re-Exam Filing Date Sep. 13, 2011, U.S. Pat. No. 7,858,149, Electronic Acknowledgment Receipt, Feb. 17, 2015, 2 pages.
Gillanders, Re-Exam Application No. 95/001,717, Re-Exam Filing Date Sep. 13, 2011, U.S. Pat. No. 7,858,149, Decision on Request for Hearing mailed Jan. 16, 2015, 9 pages.
Gillanders, Re-Exam Application No. 90/013,429, Re-Exam Filing Date Jan. 19, 2015, U.S. Pat. No. 8,343,579, Request for Ex Parte Reexamination dated Feb. 27, 2015, 15 pages.
Gillanders, Re-exam Application No. 90/013,429, Re-Exam Filing Date Jan. 19, 2015, U.S. Pat. No. 8,343,579, 37 CFD 1.501 Information Disclosure Citation in a Patent, dated Feb. 25, 2015, 2 pages.
Scotchkote 134 Fusion Bonded Epoxy Coating, Information, Properties and Test Results, 3M Corrosion Protection Products, 2000, 14 pages.
Vista Irrigation District Standard Specifications, Section 04100—Fusion-Bonded Epoxy Linings and Coatings, Vista Irrigation District (Rev. Mar. 1999), 7 pages.
Mark Schilling, Coating Adhesion Testing in Accordance with ASTM D4541—Sticky Business, Apr. 2004, 2 pages.
Gillanders, et. al., Methods and Systems for Coating and Sealing Inside Piping Systems, Utility U.S. Appl. No. 14/485,177, filed Sep. 12, 2014 (Divisional of '579 Patent in Reexam), Information Disclosure Statement (IDS) filed with PTO on May 20, 2015, "All References Considered Expect Where Lined Through", 4 pages.
Order Denying Defendants' Motion for Partial Summary Judgment of Invalidity and Granting in Part Plaintiff's Motion for Summary Judgment of Validity, United States District Court Central District of California Southern Division, *Pipe Restoration Technologies, LLC, et al. v. Pipeline Restoration Plumbing, Inc. et al.*, Case No. SACV 1300499-CJC (RNBx), Jul. 8, 2014, 10 pages.
"Your Home's Plumbing System", by Tim Oglesby (Home Check America). This document is accessible at web.archive.org website at (version of Dec. 22, 2005): http://web.archive.Org/web/20051222132445/http://media.reliancenetwork.com/media/downloads/RemaxIL/200565101848.pdf. 8 pages.
"Water Pipeline Design Guidelines", published by Saskatchewan Environment (dated Apr. 2004). This document is accessible at web.archive.org website at (version of Nov. 3, 2012): https://web.archive.Org/web/20120311170322/http://www.saskh2o.ca/DWBinder/EPB276WaterPipelineDesignGuidelines.pdf. 13 pages.
"High water pressure fact sheet", published by City of Olympia (Capital of Washington State). This document is accessible at web.archive.org website at (version of Dec. 11, 2012): https://web.archive.Org/web/20121102104045/http://olympiawa.gov/city"utilities/drinking-water/conservation/~/media/Files/PublicWorks/WaterResources/PRV%20Flyer_2012.pdf. 2 pages.
"Water Pressure: What Causes It?", published by Columbus Water Works. This document is accessible at web.archive.org website at (version of Mar. 28, 2014): https://web.archive.Org/web/20140328093048/https://www.cwwga.org/documentlibrary/180_BILLSTUFFER%20-%20APRIL%202011%20-%20WATER%20PRESSURE.pdf. 2 pages.
"Codigo Tecnico de la Edification: Salubridad", published by the Spanish Ministry of Public Works and Transportation (document in Spanish). The norms included in this document are of general application in Spain. This document is accessible at web.archive.org website at (version of Sep. 4, 2011): https://web.archive.Org/web/20110409122148/http://www.codigotecnico.org/cte/export/sites/default/web/galerias/archivos/DB_HS_2009.pdf. 135 pages.
"Pressure Pipe System Ratings", published by Polypipe. This document is accessible at web.archive.org website at (version of Mar. 28, 2014): https://web.archive.Org/web/20140328093900/http://www.polypipe.com/cms/toolbox/Terrain_Pressure_HPPE_Pipe_System_Ratings.pdf. 5 pages.
"Ezeeflow Technical Manual", published by Ezeeflow. This document is accessible at web.archive.org website at (version of Jul. 9, 2012): https://web.archive.Org/web/20120907105306/http://www.globalhardwaregy.com/wp-upload/2011/06/Ezeeflow_Catalog_.pdf. 25 pages.
Gillanders, U.S. Appl. No. 12/881,328, filed Sep. 14, 2010. Office Action Summary received from the U.S. Patent Office, dated Nov. 19, 2013, 10 pages.
Gillanders, U.S. Appl. No. 11/946,107 filed Nov. 28, 2007, Notice of Allowance received from the U.S. Patent Office, dated Feb. 27, 2014, 9 pages.
A-S Method, We are a person you are looking for A-S Method Pipe Rehabilitation System, Toyo Lining Co., Ltd., 1981, pp. 00789-00807, 19 pages.
Gillanders, European Patent Application 15178498.0-1754 filed Jul. 27, 2015, Extended European Search Report dated Nov. 27, 2015, 11 pages.
Gillanders, European Patent Application 12747878.2-1301 filed Aug. 10, 2012, Extended Supplementary European Search Report dated Dec. 23, 2015, 14 pages.
NSF/ANSI 61-2002e, Section 5. Barrier Materials, 2002, 8 pages.
ANSI/AWWA C210-97, AWWA Standard for Liquid-Epoxy Coating Systems for the Interior and Exterior of Steel Water Pipelines, 1997, 24 pages.
Gillanders, Reexamination U.S. Appl. No. 90/013,429, filed Jul. 23, 2015 for Reexamination of U.S. Pat. No. 8,343,579 merged with Gillanders, Reexamination U.S. Appl. No. 90/013,548, filed Jul. 23, 2015 for Reexamination of U.S. Pat. No. 8,343,579 Official Action from PTO dated Nov. 23, 2015, 6 pages.

\* cited by examiner

6 General Process Steps

PROCESS FLOWCHART

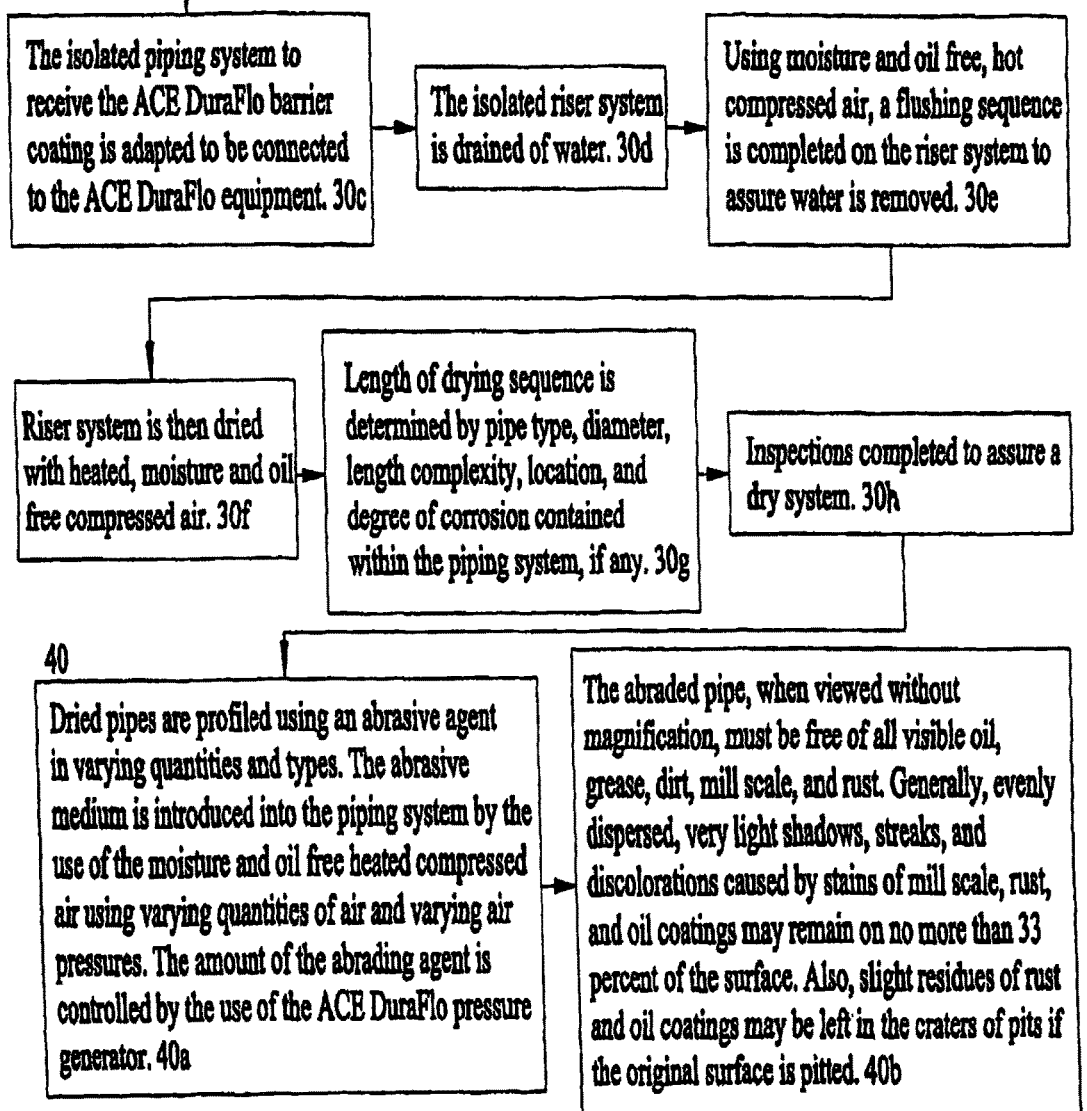

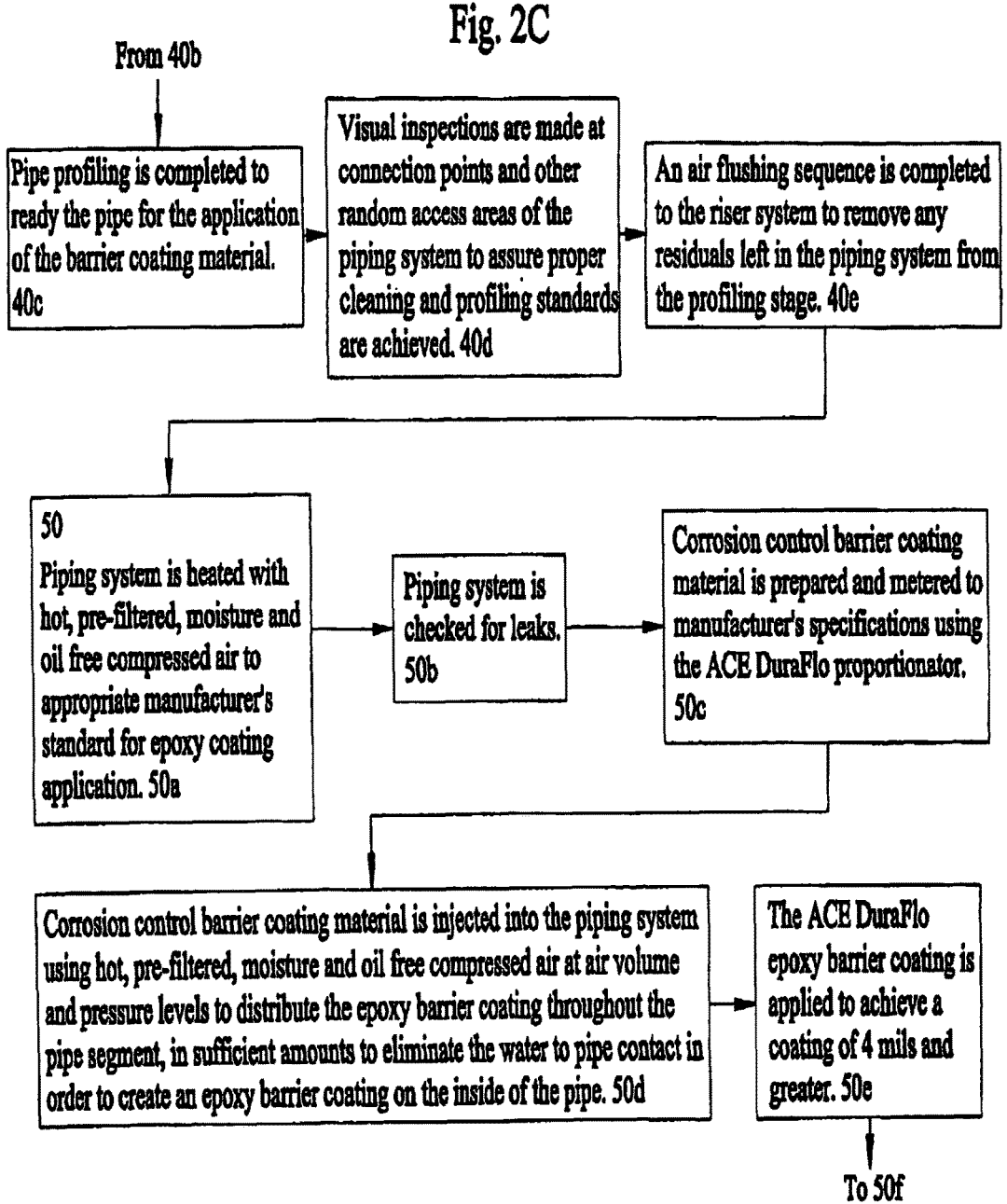

Figure 4

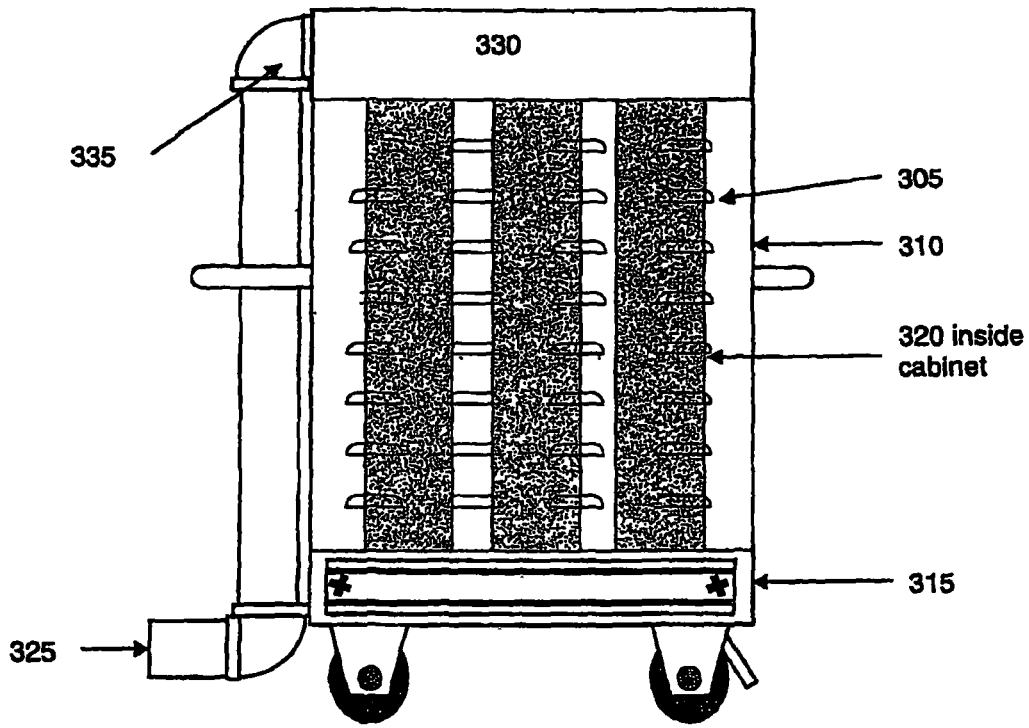

SPECIFICATIONS:
12 & 14 Gauge Steel Construction
Approximate Dimensions: 34"w x 46"l x 76"h.
Ford Grabber Blue Powder-coating
Vented Access Panels on Both Sides of Unit - 305
Vented End Panels - 310
Dust Drawer with Removable Pan - 315
Canvas Dust Bag Diffusers - 320
2" NPT Inlet - 325
4" x 8" Expansion Chamber - 330
Overhead Plenum - 335
Two Swivel Casters - 340
Two Locking Casters - 350
Push/Pull Handles - 360

EXHAUST AIR DIFFUSER - 300

Air Manifold - 400

Fig. 5B
Fig. 5C
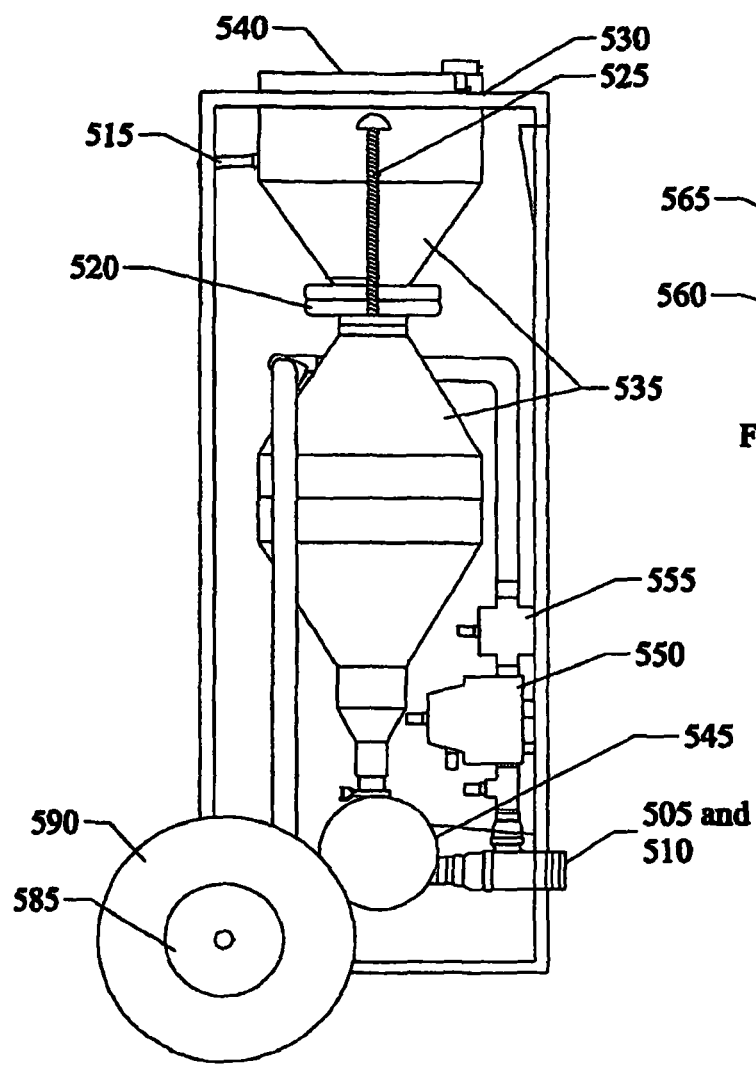
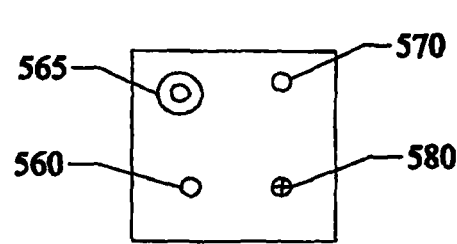
Front Control Panel
Sander - 500

Figure 6B                    Figure 6A
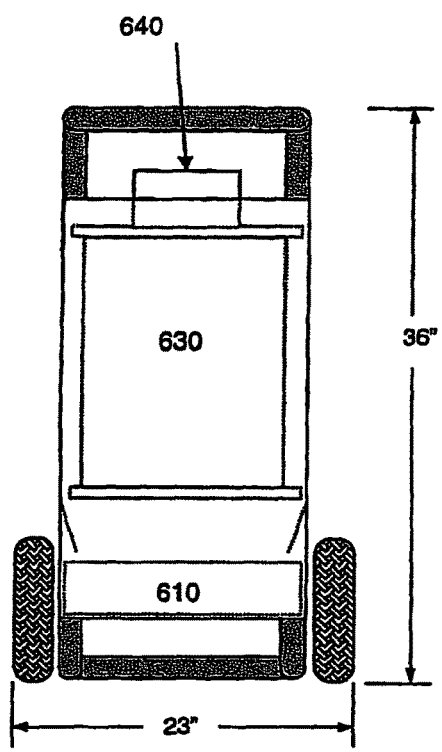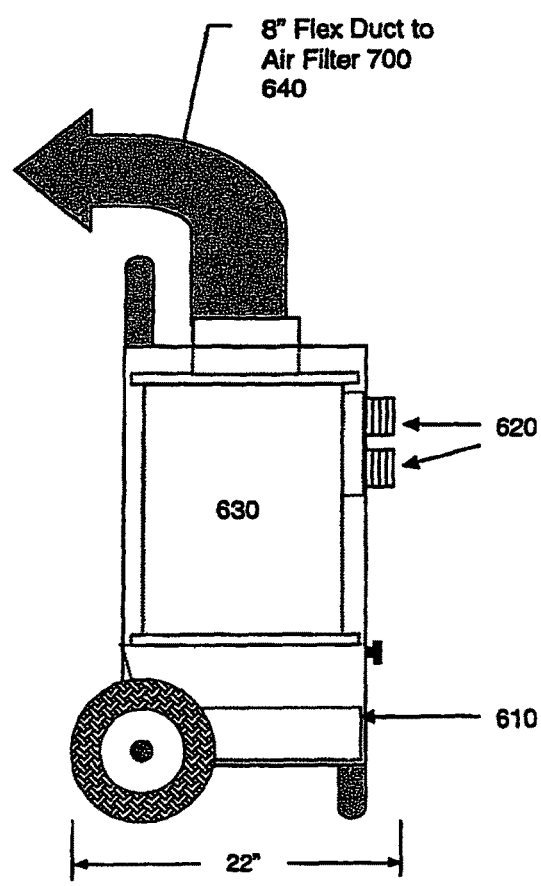

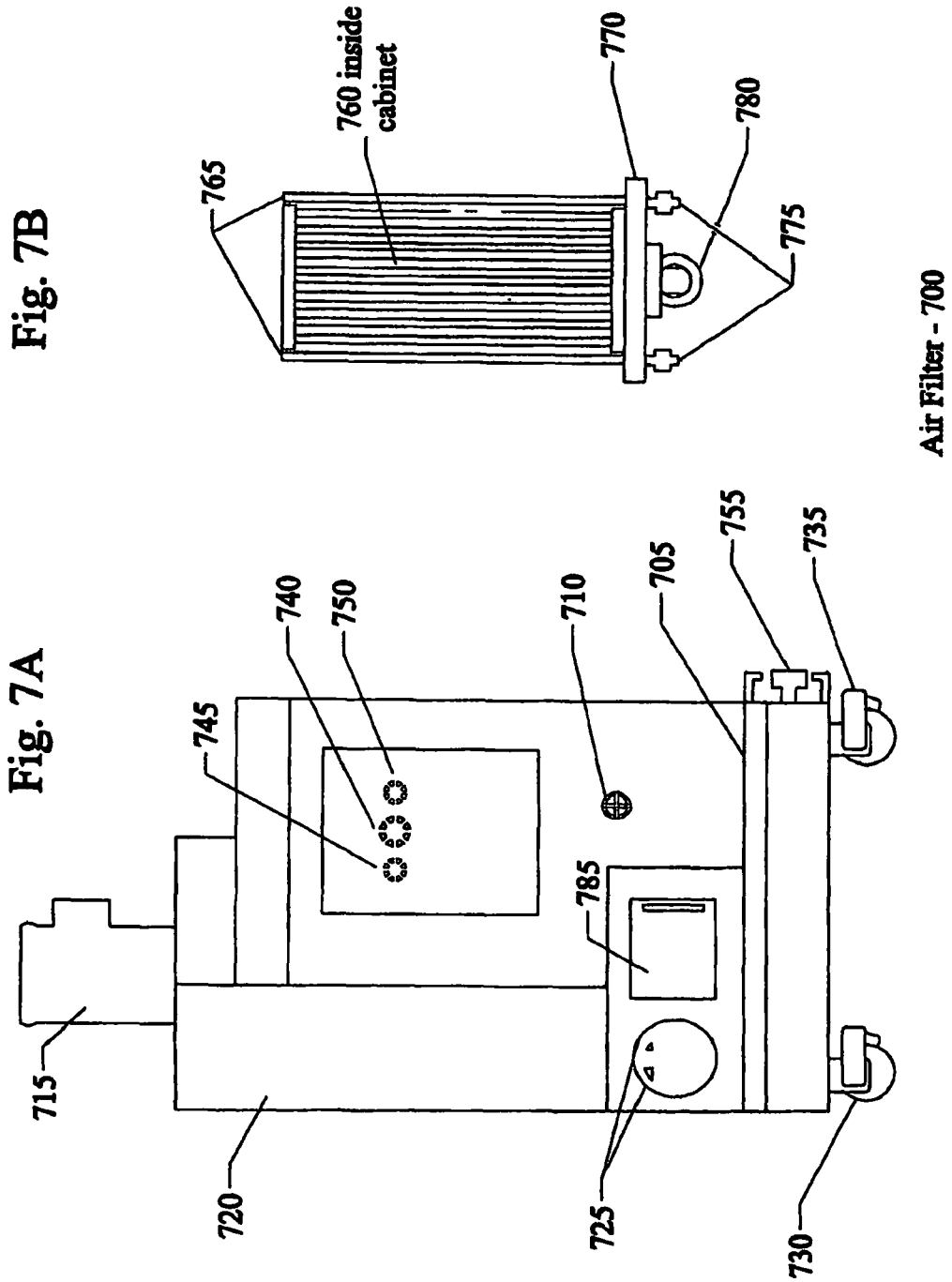

Fig. 8A
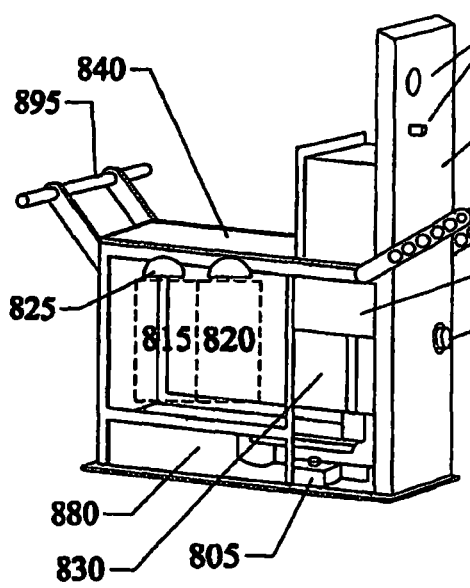
Fig. 8D
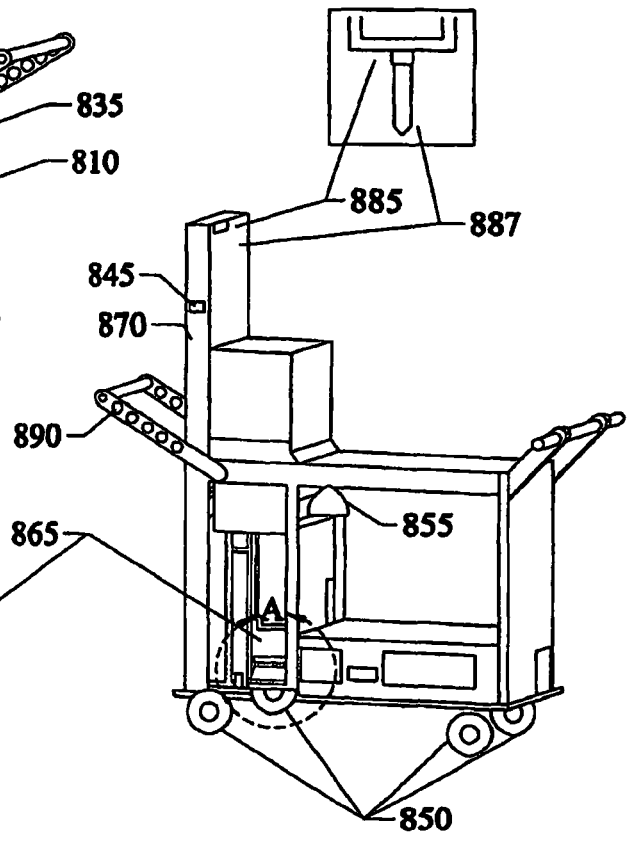
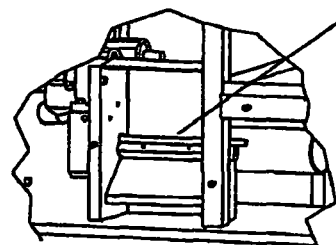
Fig. 8C
Fig. 8B
Portable Epoxy Metering and
Dispensing Unit - 800

US 10,076,769 B2

PROCESSES FOR COATING THE INTERIOR SURFACES OF NONMETAL PIPES

This application is a Divisional Patent Application of U.S. Patent Application Serial No. Divisional Application of U.S. patent application Ser. No. 15/594,149 filed May 12, 2017, now U.S. Pat. No. 9,889,470, which is a Divisional of U.S. patent application Ser. No. 15/254,324 filed Sep. 1, 2016 now U.S. Pat. No. 9,744,561 which is a divisional of Ser. No. 14/324,455 filed Jul. 7, 2014, now U.S. Pat. No. 9,446,429 which is a Divisional Application of U.S. patent application Ser. No. 13/210,659 filed Aug. 16, 2011, now U.S. Pat. No. 8,887,660, which is a Divisional Application of U.S. patent application Ser. No. 12/947,012 filed Nov. 16, 2010, now U.S. Pat. No. 8,354,140, which is a Divisional Application of U.S. patent application Ser. No. 12/378,670 filed Feb. 18, 2009, now U.S. Pat. No. 8,206,783, which is a Divisional Application of U.S. patent application Ser. No. 11/246,825 filed Oct. 7, 2005, now U.S. Pat. No. 7,517,409, which is a Divisional Application of U.S. patent application Ser. No. 10/649,288 filed Aug. 27, 2003, now U.S. Pat. No. 7,160,574, which claims the benefit of priority to U.S. Provisional Patent Application 60/406,602 filed Aug. 28, 2002. The entire disclosure of each of the applications listed in this paragraph are incorporated herein by specific reference thereto.

FIELD OF INVENTION

This invention relates to piping repair and restoration, and in particular to methods, systems and apparatus for cleaning and providing barrier protective coatings to the interior walls of small metal and plastic type pipes such as drain lines, hot water lines, cold water lines, potable water lines, natural gas lines, HVAC piping systems, drain lines, and fire sprinkler system lines, and the like, that are used in multi-unit residential buildings, office buildings, commercial buildings, and single family homes, and the like.

BACKGROUND AND PRIOR ART

Large piping systems such as those used in commercial buildings, apartment buildings, condominiums, as well as homes and the like that have a broad base of users commonly develop problems with their pipes such as their water and plumbing pipes, and the like. These problems can include leaks caused by pipe corrosion and erosion, as well as blockage from mineral deposits that develop over time where materials build up directly inside the pipes. Presently when a failure in a piping system occurs the repair method may involve a number of applications. Those repair applications may involve a specific repair to the area of failure such as replacing that section of pipe or the use of a clamping devise and a gasket. In some cases the complete piping system of the building may need to be replaced.

In the case of pipes where the water flow has been impeded by rust build up or by a deposit build up such as calcium and other minerals, various methods for the removal of the rust or other build up have been used. However the damage caused by the rust or from other deposits to the pipe wall cannot be repaired unless the pipe is replaced.

Traditional techniques to correct for the corrosion, leakage and blockage problems have included replacing some or all of a building's pipes. In addition to the large expense for the cost of the new pipes, additional problems with replacing the pipes include the immense labor and construction costs that must be incurred for these projects.

Most piping systems are located behind finished walls or ceilings, under floors, in concrete or underground. From a practical viewpoint simply getting to the problem area of the pipe to make the repair can create the largest problem. Getting to the pipe for making repairs can require tearing up the building, cutting concrete and/or having to dig holes through floors, the foundation or the ground. These labor intensive repair projects can include substantial demolition of a buildings walls and floors to access the existing piping systems. For example, tearing out the interior walls to access the pipes is an expected result of the demolition.

Once the walls and floors have been opened, then the old pipes are usually pulled out and thrown out as scrap, which is then followed by replacement with new pipes. These prior techniques do little if nothing to reuse, refix, or recycle the old pipes.

In addition, there are usually substantial costs for removing the debris and old pipes from the worksite. With these projects both the cost of new pipes and the additional labor to install these pipes are required expenditures. Further, there are additional added costs for the materials and labor to replumb these new pipes along with the necessary wall and floor repairs that must be made to clean up for the demolition effects. For example, getting at and fixing a pipe behind drywall is not completing the repair project. The drywall must also be repaired, and just the drywall type repairs can be extremely costly. Additional expenses related to the repair or replacement of an existing piping system will vary depending primarily on the location of the pipe, the building finishes surrounding the pipe and the presence of hazardous materials such as asbestos encapsulating the pipe. Furthermore, these prior known techniques for making piping repair take considerable amounts of time that can include many months or more to be completed which results in lost revenue from tenants and occupants of commercial type buildings since tenants cannot use the buildings until these projects are completed.

Finally, the current pipe repair techniques are usually only temporary. Even after encountering the cost to repair the pipe, the cost and inconvenience of tearing up walls or grounds and if a revenue property the lost revenue associated with the repair or replacement, the new pipe will still be subject to the corrosive effects of fluids such as water that passes through the pipes.

Over the years many attempts have been proposed for cleaning water type pipes with chemical cleaning solutions. See for example, U.S. Pat. No. 5,045,352 to Mueller; U.S. Pat. No. 5,800,629 to Ludwig et al.; U.S. Pat. No. 5,915,395 to Smith; and U.S. Pat. No. 6,345,632 to Ludwig et al. However, all of these systems require the use of chemical solutions such as liquid acids, chlorine, and the like, that must be run through the pipes as a prerequisite prior to any coating of the pipes. The National Sanitation Foundation (NSF) specifically does not allow the use of any chemical agent solutions for use with cleaning potable water piping systems. Thus, these systems cannot be legally used in the United States for cleaning out water piping systems.

Other systems have been proposed that use dry particulate materials as a cleaning agent that is sprayed from mobile devices that travel through or around the pipes. See U.S. Pat. No. 4,314,427 to Stolz; and U.S. Pat. No. 5,085,016 to Rose. However, these traveling devices require large diameter pipes to be operational and cannot be used inside of pipes that are less than approximately 6 inches in diameter, and would not be able to travel around narrow bends. Thus, these devices cannot be used in small diameter pipes found in potable water piping systems that also have sharp and narrow bends.

The proposed systems and devices referenced above generally require sectioning a small pipe length for cleaning and coating type applications, or limiting the application to generally straight elongated pipe lengths. For large building such as multistory applications, the time and cost to section off various piping sections would be cost prohibitive. None of the prior art is known to be able to service an entire building's water type piping system at one time in one complete operation.

Thus, the need exists for solutions to the above problems with fixing existing piping systems in buildings.

SUMMARY OF THE INVENTION

A primary objective of the invention is to provide methods, systems and devices for repairing interior walls of pipes in buildings without having to physically remove and replace the pipes.

A secondary objective of the invention is to provide methods, systems and devices for repairing interior walls of pipes by initially cleaning the interior walls of the pipes.

A third objective of the invention is to provide methods, systems and devices for repairing interior walls of pipes by applying a corrosion protection barrier coating to the interior walls of the pipes.

A fourth objective of the invention is to provide methods, systems and devices for repairing interior walls of pipes in buildings in a cost effective and efficient manner.

A fifth objective of the invention is to provide methods, systems and devices for repairing interior walls of pipes which is applicable to small diameter piping systems from approximately ⅜" to approximately 6" in piping systems made of various materials such as galvanized steel, black steel, lead, brass, copper or other materials such as composites including plastics, as an alternative to pipe replacement.

A sixth objective of the invention is to provide methods, systems and devices for repairing interior walls of pipes which is applied to pipes, "in place" or insitu minimizing the need for opening up walls, ceilings, or grounds.

A seventh objective of the invention is to provide methods, systems and devices for repairing interior walls of pipes which minimizes the disturbance of asbestos lined piping or walls/ceilings that can also contain lead based paint or other harmful materials.

An eighth objective of the invention is to provide methods, systems and devices for repairing interior walls of pipes where once the existing piping system is restored with a durable epoxy barrier coating the common effects of corrosion from water passing through the pipes will be delayed if not stopped entirely.

A ninth objective of the invention is to provide methods, systems and devices for repairing interior walls of pipes to clean out blockage where once the existing piping system is restored, users will experience an increase in the flow of water, which reduces the energy cost to transport the water. Additionally, the barrier epoxy coating being applied to the interior walls of the pipes can create enhanced hydraulic capabilities again giving greater flow with reduced energy costs.

A tenth objective of the invention is to provide methods, systems and devices for repairing interior walls of pipes where customers benefit from the savings in time associated with the restoration of an existing piping system.

An eleventh objective of the invention is to provide methods, systems and devices for repairing interior walls of pipes where customers benefit from the economical savings associated with the restoration of an existing piping system, since walls, ceilings floors, and/or grounds do not always need to be broken and/or cut through.

A twelfth objective of the invention is to provide methods, systems and devices for repairing interior walls of pipes where income producing properties experience savings by remaining commercially usable, and any operational interference and interruption of income-producing activities is minimized.

A thirteenth objective of the invention is to provide methods, systems and devices for repairing interior walls of pipes where health benefits had previously accrued, as the water to metal contact will be stopped by a barrier coating thereby preventing the leaching of metallic and potentially other harmful products from the pipe into the water supply such as but not limited to lead from solder joints and from lead pipes, and any excess leaching of copper, iron and lead.

A fourteenth objective of the invention is to provide methods, systems and devices for repairing interior walls of pipes where the pipes are being restored in-place thus causing less demand for new metallic pipes, which is a non-renewable resource.

A fifteenth objective of the invention is to provide methods, systems and devices for repairing interior walls of pipes using a less intrusive method of repair where there is less building waste and a reduced demand on expensive landfills.

A sixteenth objective of the invention is to provide methods, systems and devices for repairing interior walls of pipes where the process uses specially filtered air that reduces possible impurities from entering the piping system during the process.

A seventeenth objective of the invention is to provide methods, systems and devices for repairing interior walls of pipes where the equipment package is able to function safely, cleanly, and efficiently in high customer traffic areas.

An eighteenth objective of the invention is to provide methods, systems and devices for repairing interior walls of pipes where the equipment components are mobile and maneuverable inside buildings and within the parameters typically found in single-family homes, multi unit residential buildings and various commercial buildings.

A nineteenth objective of the invention is to provide methods, systems and devices for repairing interior walls of pipes where the equipment components can operate quietly, within the strictest of noise requirements such as approximately seventy four decibels and below when measured at a distance of approximately several feet away.

A twentieth objective of the invention is to provide methods, systems and devices for repairing interior walls of pipe where the barrier coating material for application in a variety of piping environments, and operating parameters such as but not limited to a wide temperature range, at a wide variety of airflows and air pressures, and the like.

A twenty first objective of the invention is to provide methods, systems and devices for repairing interior walls of pipes where the barrier coating material and the process is functionally able to deliver turnaround of restored piping systems to service within approximately twenty four hours or less or no more than approximately ninety six hours for large projects.

A twenty second objective of the invention is to provide methods, systems and devices for repairing interior walls of pipes where the barrier coating material is designed to operate safely under NSF (National Sanitation Foundation)

Standard 61 criteria in domestic water systems, with adhesion characteristics within piping systems in excess of approximately 400 PSI.

A twenty third objective of the invention is to provide methods, systems and devices for repairing interior walls of pipes where the barrier coating material is designed as a long-term, long-lasting, durable solution to pipe corrosion, pipe erosion, pinhole leak and related water damage to piping systems where the barrier coating extends the life of the existing piping system.

A twenty fourth objective of the invention is to provide methods, systems and devices for both cleaning and coating interiors of pipes having diameters of up to approximately 6 inches using dry particulates, such as sand and grit, prior to coating the interior pipe walls.

A twenty fifth objective of the invention is to provide methods, systems and devices for both cleaning and coating interiors of pipes having diameters of up to approximately 6 inches in plural story buildings, without having to section off small sections of piping for cleaning and coating applications.

A twenty sixth objective of the invention is to provide methods, systems and devices for cleaning the interiors of an entire piping system in a building in a single pass run operation.

A twenty seventh objective of the invention is to provide methods, systems and devices for barrier coating the interiors of an entire piping system in a building in a single pass run operation.

The novel method and system of pipe restoration prepares and protects small diameter piping systems such as those within the diameter range of approximately ⅜ of an inch to approximately six inches and can include straight and bent sections of piping from the effects of water corrosion, erosion and electrolysis, thus extending the life of small diameter piping systems. The barrier coating used as part of the novel process method and system, can be used in pipes servicing potable water systems, meets the criteria established by the National Sanitation Foundation (NSF) for products that come into contact with potable water. The epoxy material also meets the applicable physical criteria established by the American Water Works Association as a barrier coating. Application within buildings ranges from single-family homes to smaller walk-up style apartments to multi-floor concrete high-rise hotel/resort facilities and office towers, as well as high-rise apartment and condominium buildings and schools. The novel method process and system allows for barrier coating of potable water lines, natural gas lines, HVAC piping systems, hot water lines, cold water lines, drain lines, and fire sprinkler systems.

The novel method of application of an epoxy barrier coating is applied to pipes right within the walls eliminating the traditional destructive nature associated with a re-piping job. Typically 1 riser system or section of pipe can be isolated at a time and the restoration of the riser system or section of pipe can be completed in less than one to four days (depending upon the building size and type of application) with water restored within approximately 24 to approximately 96 hours. For hotel and motel operators that means not having to take rooms off line for extended periods of time. Too, for most applications, there are no walls to cut, no large piles of waste, no dust and virtually no lost room revenue. Entire building piping systems can be cleaned within one run through pass of using the invention. Likewise, an entire building piping system can be coated within one single pass operation as well.

Once applied, the epoxy coating creates a barrier coating on the interior of the pipe. The application process and the properties of the epoxy coating ensure the interior of the piping system is fully coated. Epoxy coatings are characterized by their durability, strength, adhesion and chemical resistance, making them an ideal product for their application as a barrier coating on the inside of small diameter piping systems.

The novel barrier coating provides protection and extended life to an existing piping system that has been affected by erosion corrosion caused from internal burrs, improper soldering, excessive turns, and excessive water velocity in the piping system, electrolysis and "wear" on the pipe walls created by suspended solids. The epoxy barrier coating will create an approximately 4 mil or greater covering to the inside of the piping system.

There are primarily 3 types of metallic piping systems that are commonly used in the plumbing industry—copper, steel and cast iron. New steel pipes are treated with various forms of barrier coatings to prevent or slow the effects of corrosion. The most common barrier coating used on steel pipe is the application of a zinc based barrier coat commonly called galvanizing. New copper pipe has no barrier coating protection and for years was thought to be corrosion resistant offering a lifetime trouble free use as a piping system.

Under certain circumstances that involved a combination of factors of which the chemistry of water and installation practices a natural occurring barrier coating would form on the inside of copper pipes which would act as a barrier coating, protecting the copper piping system against the effects of corrosion from the water.

In recent history, due to changes in the way drinking water is being treated and changes in installation practices, the natural occurring barrier coating on the inside of copper pipe is not being formed or if it was formed is now being washed away. In either case without an adequate natural occurring barrier coating, the copper pipe is exposed to the effects of corrosion/erosion, which can result in premature aging and failure of the piping system.

With galvanized pipe the zinc coating wears away leaving the pipe exposed to the effects of the corrosive activity of the water. This results in the pipe rusting and eventually failing.

The invention can also be used with piping systems having plastic pipes, PVC pipes, composite material, and the like.

The novel method and system of corrosion control by the application of an epoxy barrier coating to new or existing piping systems is a preventative corrosion control method that can be applied to existing piping systems in-place.

The invention includes novel methods and equipment for providing barrier coating corrosion control for the interior walls of small diameter piping systems. The novel process method and system of corrosion control includes at least three basic steps: Air Drying a piping system to be serviced; profiling the piping system using an abrasive cleaning agent; and applying the barrier coating to selected coating thickness layers inside the pipes. The novel invention can also include two additional preliminary steps of: diagnosing problems with the piping system to be serviced, and planning and setting up the barrier coating project onsite. Finally, the novel invention can include a final end step of evaluating the system after applying the barrier coating and re-assembling the piping system.

Further objects and advantages of this invention will be apparent from the following detailed description of the presently preferred embodiments which are illustrated schematically in the accompanying drawings.

BRIEF DESCRIPTION OF THE FIGURES

FIGS. 2A, 2B, 2C and 2D shows a detailed process flowchart using the steps of FIG. 1 for providing the barrier coating.

FIG. 4 shows a side view of the novel exhaust air diffuser used in the barrier coating control system in FIG. 3.

FIG. 5B shows a side view of the novel Pressure Generator System (Sander) 500 used in the barrier coating control system of FIG. 3.

FIG. 5C is an enlarged view of the front control panel for use with the pressure generator system 500 of FIG. 5B.

FIG. 6A shows a side view of the novel Abrasive Reclaim Separator Module (Pre-Filter) used in the barrier coating control system of FIG. 3.

FIG. 6B shows an end view of the novel Abrasive Reclaim Separator Module (Pre-Filter) used in the barrier coating control system of FIG. 3.

FIG. 7A shows a side view of the novel Dust Collector System 700 (Filter) used in the barrier coating control system of FIG. 3.

FIG. 7B shows an enlarged side cross-sectional view of the mounted Cartridge Filters used in the Dust Collector System of FIG. 7A.

FIG. 8A shows a perspective view of the novel Portable Epoxy Metering and Dispensing Unit 800 (Epoxy Mixer) used in the barrier coating control system of FIG. 3.

FIG. 8B shows another perspective view of the novel Portable Epoxy Metering and Dispensing Unit 800 (Epoxy Mixer) used in the barrier coating control system of FIG. 3.

FIG. 8C shows an enlarged view of the foot dispenser activator a part of the novel Portable Epoxy Metering and Dispensing Unit 800 (Epoxy Mixer) used in the barrier coating control system of FIG. 3.

FIG. 8D is an enlarged view of the mixing tubes and mixing head of FIG. 8B

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 1:
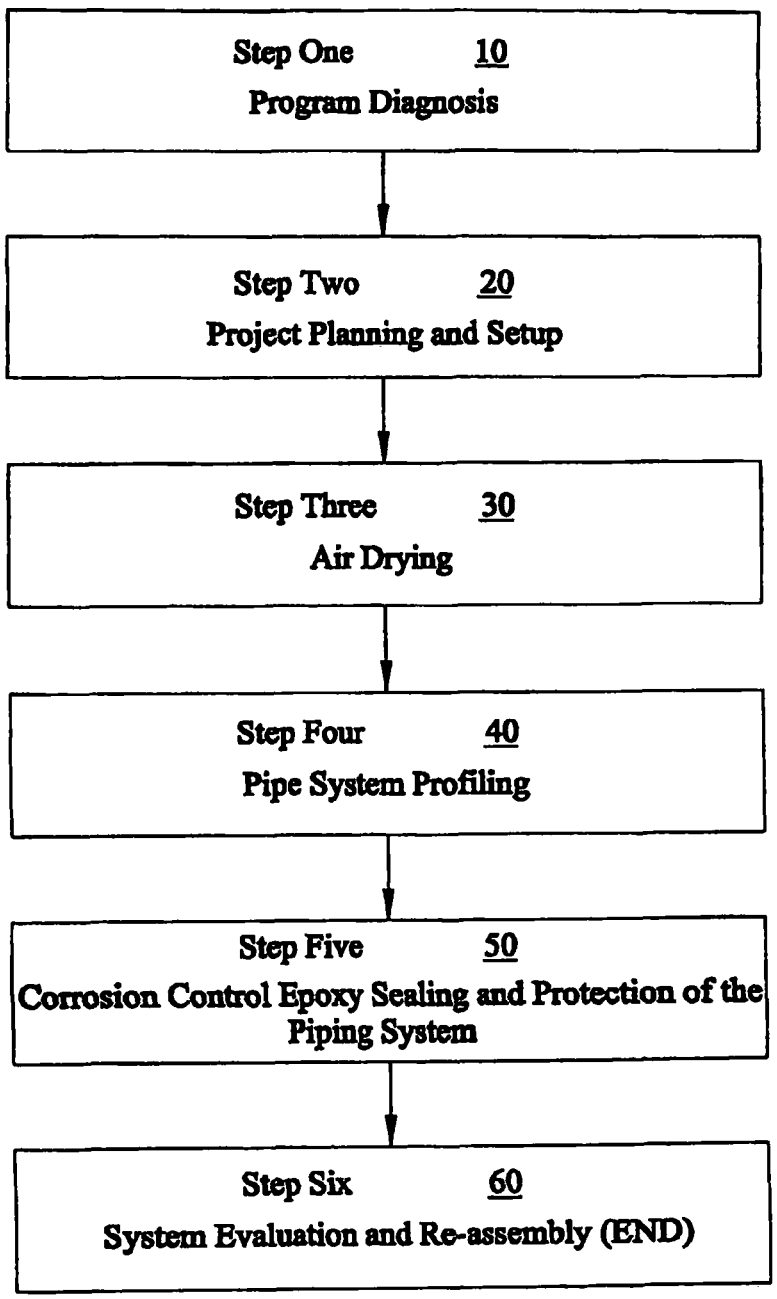
FIG. 1 shows the general six steps that is an overview for applying the barrier coating.
Figure 2A:
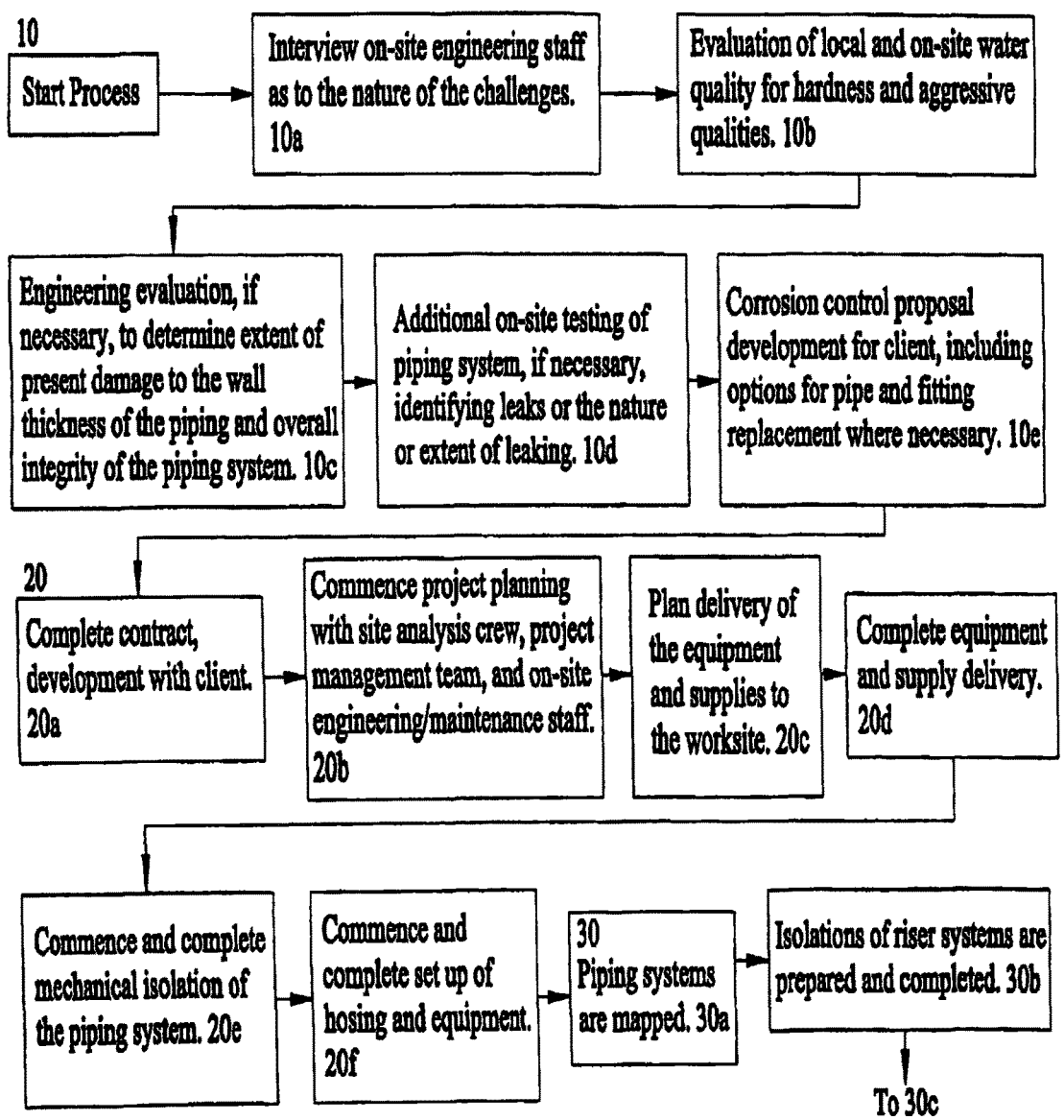
Figure 2D:
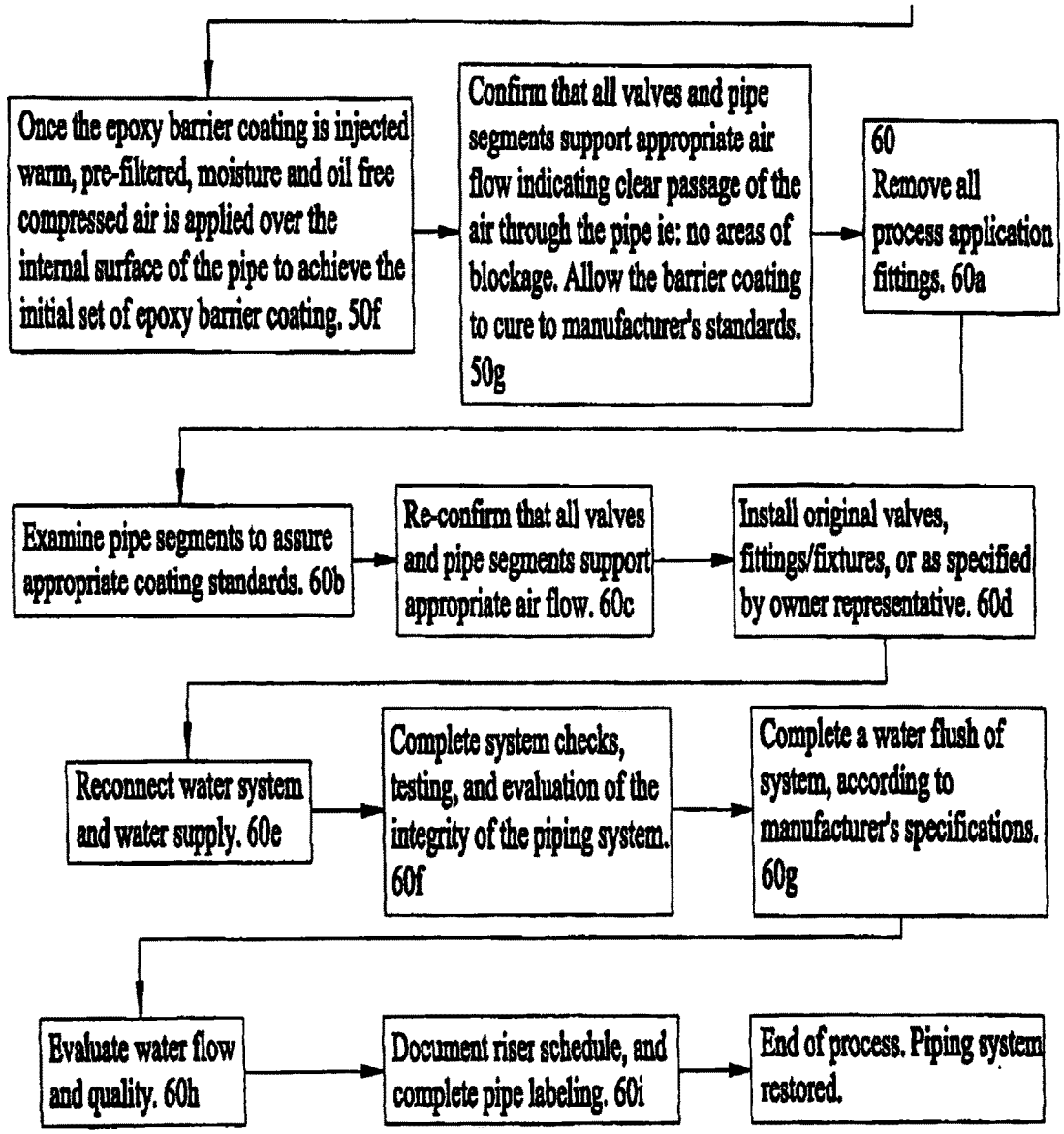

FIG. 1 shows the general six steps for a project overview for applying the barrier coating to an existing piping system, which include step one, 10 program diagnosis, step two, 20 project planning, step three, 30 drying piping system, step four 40, profiling the piping system, step five, 50 barrier coating interior walls of the pipes in the piping system, and final step six 60 evaluation and return to operation of the piping system.

Step One—Problem Diagnosis 10

For step one, 10, several steps can be done to diagnose the problem with a piping system in a building, and can include:
(a) Interview onsite engineering staff, property mangers, owners or other property representatives as to the nature of the current problem with the piping system.
(b) Evaluation of local and on-site water chemistry being used in the piping system for hardness and aggressive qualities.
(c) Engineering evaluation, if necessary, to determine extent of present damage to the wall thickness of the piping and overall integrity of the piping system.
(d) Additional on-site testing of piping system, if necessary, identifying leaks or the nature or extent of leaking.
(e) Corrosion control proposal development for client, including options for pipe and fitting replacement where necessary.
(f)
After completion of step one, 10, the project planning and setup step 20 can be started.

Step Two—Project Planning and Setup 20

For step two, 20, several steps can be followed for planning and setup for restoring the integrity of the piping system in a building, and can include:
(a) Complete contract development with client, after the diagnosis contract has started.
(b) Commence project planning with site analysis crew, project management team, and on-site engineering/maintenance staff.
(c) Plan delivery of the equipment and supplies to the worksite.
(d) Complete equipment and supply delivery to worksite.
(e) Commence and complete mechanical isolation of the piping system.
(f) Commence and complete set up of hosing and equipment.

Step Three—Air Drying—Step 1 Method of Corrosion Control 30

For step three, 30, the piping system to be prepared for the coating by drying the existing pipes, and can include:
(a) Piping systems are mapped.
(b) Isolations of riser systems or pipe sections are prepared and completed.
(c) The isolated piping system to receive the barrier coating is adapted to be connected to the barrier coating equipment.
(d) The isolated riser system is drained of water.
(e) Using moisture and oil free, hot compressed air, a flushing sequence is completed on the riser system to assure water is removed.
(f) Riser system is then dried with heated, moisture and oil free compressed air.
(g) Length of drying sequence is determined by pipe type, diameter, length complexity, location and degree of corrosion contained within the piping system, if any.
(h) Inspections are completed to assure a dry piping system ready for the barrier coating.

Step Four—Piping System Profiling—Step 2 of Method of Corrosion Control 40

For step four, 40, the piping system is to be profiled, and can include:
(a) Dried pipes can be profiled using an abrasive agent in varying quantities and types. The abrasive medium can be introduced into the piping system by the use of the moisture and oil free heated compressed air using varying quantities of air and varying air pressures. The amount of the abrading agent is controlled by the use of a pressure generator.

(b) The abraded pipe, when viewed without magnification, must be generally free of all visible oil, grease, dirt, mill scale, and rust. Generally, evenly dispersed, very light shadows, streaks, and discolorations caused by stains of mill scale, rust and old coatings may remain on no more than approximately 33 percent of the surface. Also, slight residues of rust and old coatings may be left in the craters of pits if the original surface is pitted.

(c) Pipe profiling is completed to ready the pipe for the application of the barrier coating material.

(d) Visual inspections can be made at connection points and other random access areas of the piping system to assure proper cleaning and profiling standards are achieved.

(e) An air flushing sequence is completed to the riser system to remove any residuals left in the piping system from the profiling stage.

Step Five—Corrosion Control Epoxy Sealing and Protection of the Piping—Step 3 of the Method of Corrosion Control 50

For step five, 50, the piping system is to barrier coated and can include:

(a) Piping system can be heated with hot, pre-filtered, moisture and oil free compressed air to an appropriate standard for an epoxy coating application.

(b) Piping system can be checked for leaks.

(c) Corrosion control barrier coating material can be prepared and metered to manufacturer's specifications using a proportionator.

(d) Corrosion control barrier coating material can be injected into the piping system using hot, pre-filtered, moisture and oil free compressed air at temperatures, air volume and pressure levels to distribute the epoxy barrier coating throughout the pipe segment, in sufficient amounts to eliminate the water to pipe contact in order to create an epoxy barrier coating on the inside of the pipe.

(e) The epoxy barrier coating can be applied to achieve coating of approximately 4 mils and greater.

(f) Once the epoxy barrier coating is injected warm, pre-filtered, moisture and oil free compressed air can be applied over the internal surface of the pipe to achieve the initial set of the epoxy barrier coating.

(g) Confirm that all valves and pipe segments support appropriate air flow indicating clear passage of the air through the pipe i.e.: no areas of blockage. Allow the barrier coating to cure to manufacturer's standards.

Step Six—System Evaluation and Re-Assembly 60

The final step six, 60 allows for restoring the piping system to operation and can include:

(a) Remove all process application fittings.

(b) Examine pipe segments to assure appropriate coating standards.

(c) Re-confirm that all valves and pipe segments support appropriate air flow.

(d) Install original valves, fittings/fixtures, or any other fittings/fixtures as specified by building owner representative.

(e) Reconnect water system, and water supply.

(f) Complete system checks, testing and evaluation of the integrity of the piping system.

(g) Complete a water flush of system, according to manufacturer's specifications.

(h) Evaluate water flow and quality.

(i) Document riser schedule, and complete pipe labeling.

FIGS. 2A, 2B, 2C and 2D show a detailed process flowchart using the steps of FIG. 1 for providing the barrier coating. These flow chart figures show a preferred method of applying a novel barrier coating corrosion control for the interior of small diameter piping systems following a specific breakdown of a preferred application of the invention.

Figure 3:
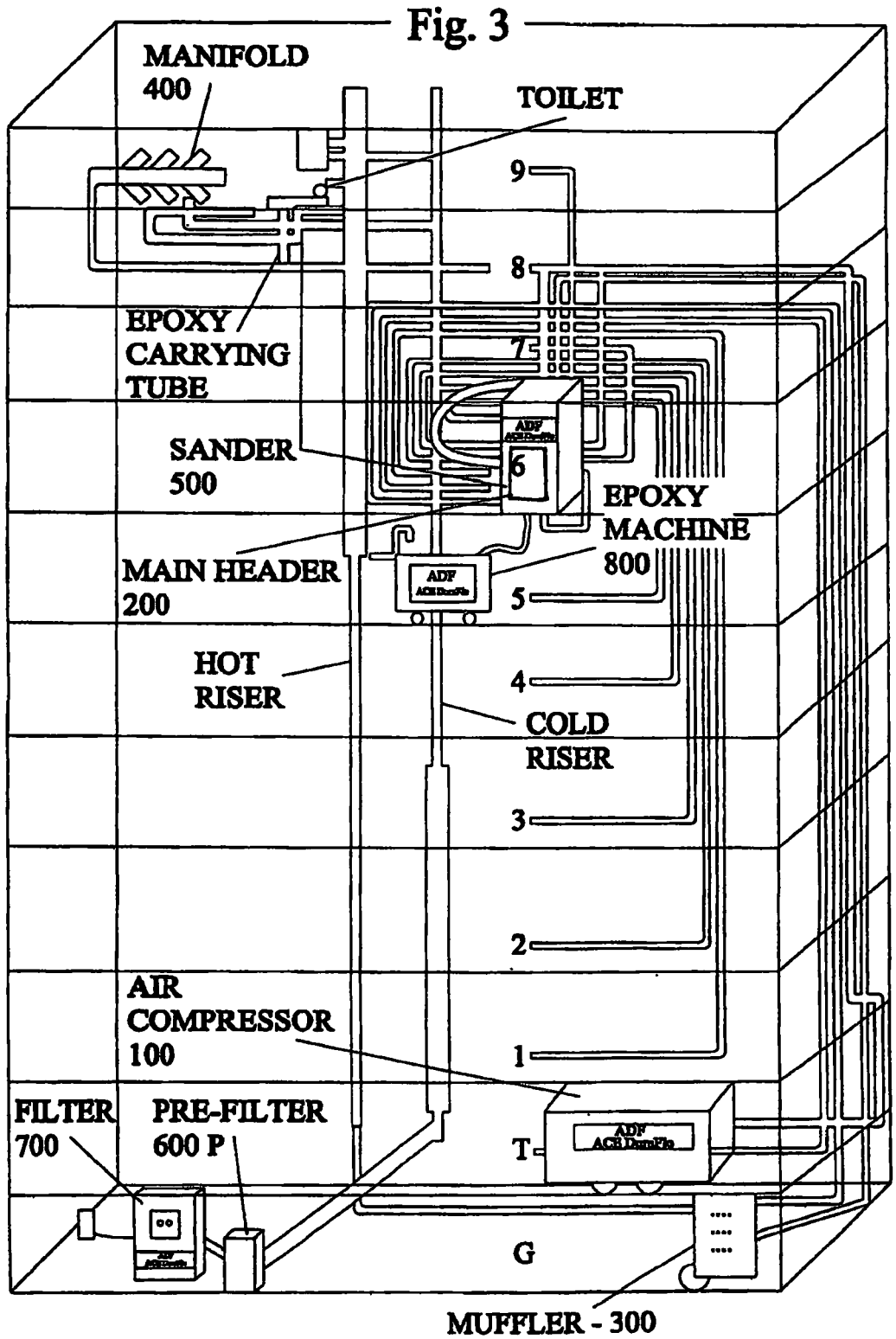
FIG. 3 shows a side view of a multi-story story building using the novel barrier coating corrosion control method and system of the invention.

FIG. 3 shows a side view of a ten story building setup for using the novel method and system of the invention. Components in FIG. 3 will now be identified as follows:

| IDENTIFIER | EQUIPMENT |
| --- | --- |
| 100 | 395, 850, 1100, 1600 CFM Compressors Outfitted with Aftercooler, Water separator, Fine Filter and Reheater |
| 200 | Main Air Header and Distributor (Main Header) |
| 300 | Exhaust Air Diffuser (Muffler) |
| 400 | Portable Air Distribution Manifold (Floor Header) |
| 500 | Pressure Generator System (Sander) |
| 600 | Reclaim Separator Module (Pre-Filter) |
| 700 | Dust Collector System (Filter) |
| 800 | Portable Epoxy Metering and Dispensing Unit (Epoxy Mixer) |
| 900 | Epoxy Barrier Coating |

Referring to FIG. 3, components 100-800 can be located and used at different locations in a ten story building. The invention allows for an entire building piping system to be cleaned in one single pass through run without having to dismantle either the entire or multiple sections of the piping system. The piping system can include pipes having diameters of approximately ⅜ of an inch up to approximately 6 inches in diameter with the piping including bends up to approximately ninety degrees or more throughout the building. The invention allows for an entire building piping system to have the interior surfaces of the pipes coated in one single pass through run without having to dismantle either the entire or multiple parts of the piping system. Each of the components will now be defined.

100 Air Compressor

The air compressors 100 can provide filtered and heated compressed air. The filtered and heated compressed air employed in various quantities is used, to dry the interior of the piping system, as the propellant to drive the abrasive material used in cleaning of the piping system and is used as the propellant in the application of the epoxy barrier coating and the drying of the epoxy barrier coating once it has been applied. The compressors 100 also provide compressed air used to propel ancillary air driven equipment.

200 Main Air Header and Distributor

Figure 9:
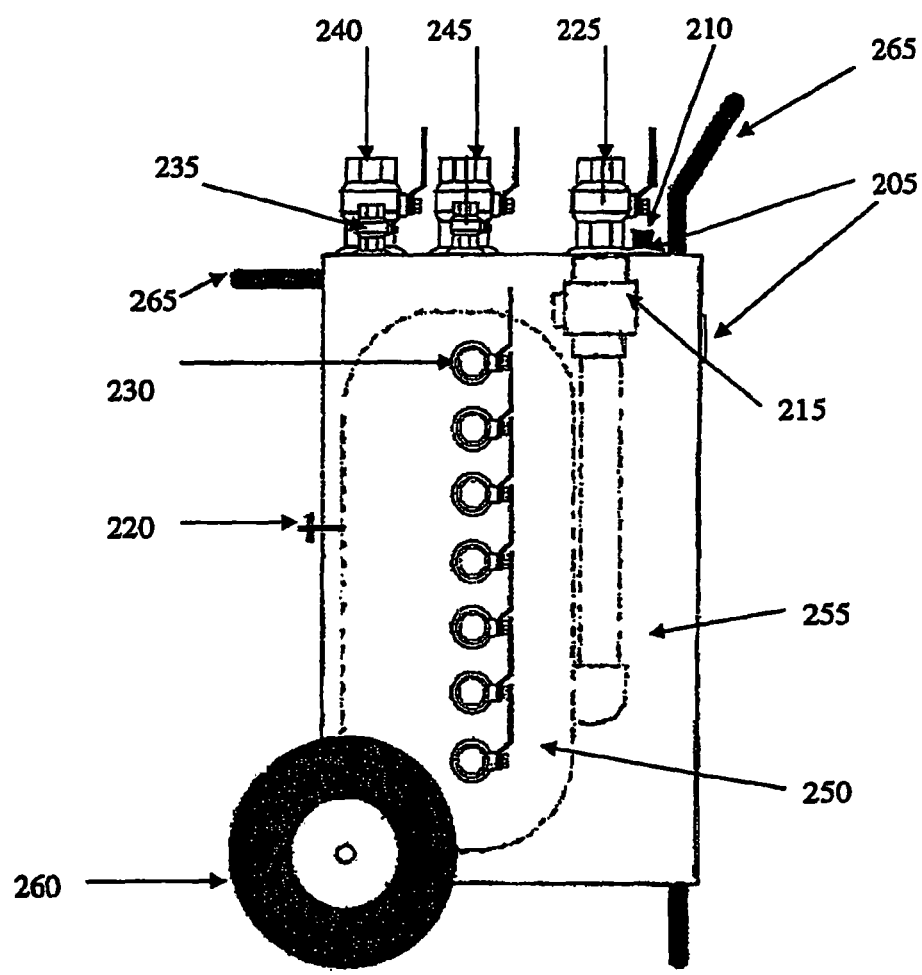
FIG. 9 shows a side view of the novel Main Air Header and Distributor 200 (Header) used in the barrier coating control system of FIG. 3.

An off the shelf main header and distributor 200 shown in FIGS. 3 and 9 can be one Manufactured By: Media Blast & Abrasives, Inc. 591 W. Apollo Street Brea, Calif. 92821 The components of the main header and distributor of FIG. 9 are labeled as follows.

Description of Main Header Equipment Describing Each Component:

12 & 14 Gauge Steel Construction

Approximate Dimensions: 28"w×27"l×53"h

Ford Grabber Blue Powder-coating

Air Pressure Gauge 205

Regulator Adjustment 210

Air Pressure Regulator 215
Moisture Bleeder Valve 220
2 2" NPT Inlet With Full Port Ball Valve 225
14—1" Side-Mounted Ball Valves—Regulated Air 230
4—1" Top Mounted Ball Valves—Unregulated Air 235
1—2" Top Mounted full port Ball Valve—Unregulated Air 240
1—2" Top Mounted Full Port Ball Valve—Regulated Air 245
1.9 Cubic Feet Pressure Pot 250
Insulated Cabinet 255
Two Inflatable Tires 260
Push/Pull Handles 265

Referring to FIGS. 3 and 9, the Main Header 200 provides safe air management capability from the air compressor for both regulated and unregulated air distribution (or any combination thereof) to the various other equipment components and to both the piping system risers and fixture outlets for a range of piping configurations from a single family home to a multi-story building. The air enters through the 2" NPT inlet, 225 to service the pressure vessel. The main header 200 can manage air capacities ranging to approximately 1100 CFM and approximately 125 psi.

There are many novel parts and benefits with the Main Header and Distributor 200. The distributor is portable and is easy to move and maneuver in tight working environments. Regulator Adjustment 210 can easily and quickly manage air capacities ranging to approximately 1600 CFM and approximately 200 psi, and vary the operating airflows to each of the other ancillary equipment associated with the invention. The Air Pressure Regulator 210 and the Method of Distributing the air allows both regulated and unregulated air management from the same equipment in a user-friendly, functional manner. The approximately 1" Valving 230, 235, 245 allows accommodation for both approximately 1" hosing and with adapters, and hose sizes of less than approximately 1"" can be used to meet a wide variety of air demand needs on a job site. The insulated cabinet 255, surrounding air works dampens noise associated with the movement of the compressed air. The insulated cabinet 255, helps retain heat of the pre-dried and heated compressed air, the pre-dried and heated compressed air being an integral part of the invention. The insulated cabinet 255, helps reduce moisture in the pressure vessel and air supply passing through it. Finally, the valving of the pressure vessel allows for delivery (separate or simultaneous) of regulated air to the side mounted air outlet valves 230, the top mounted regulated air outlet valves 245, as well as the top mounted unregulated air outlet valves 235 and 240.

FIG. 4 shows a side view of the novel exhaust air diffuser 300 used in the barrier coating control system in FIG. 3.
300 Exhaust Air Diffuser (Muffler)
Referring to FIGS. 3 and 4, an exhaust air diffuser and muffler 300 that can be used with the invention can be one Manufactured By: Media Blast & Abrasives, Inc. 591 W. Apollo Street, Brea, Calif. 92821.
Description of Muffler 300 components:
  12 & 14 Gauge Steel Construction
  Approximate Dimensions: 34"w×46"l×76"h
  Ford Grabber Blue Powder-coating
  Vented Access Panels on Both Sides of Unit 305
  Vented End Panels 310
  Dust Drawer with Removable Pan 315
  Canvas Dust Bag Diffusers 320
  2" NPT Inlet 325
  4"×8" Expansion Chamber 330
  Overhead Plenum 335
  Two Swivel Casters 340
  Two Locking Casters 350
  Push/Pull Handles 360

Referring to FIGS. 3 and 4, the Air Diffuser/Muffler 300 allows the safe, wholesale dumping of unregulated or regulated air from the compressor off of the Main Header 200 through the approximately 2" NPT inlet, into the expansion chamber and canvas dust bag diffusers for the purpose of controlling the air temperature in the piping system during the drying phase, the pipe warming phase, the epoxy application phase and the initial curing phase of the epoxy barrier coating material after it is injected into the piping system. The Air diffuser 300 can eliminate the need to operate the air filter 600 during various stages of the process, promoting energy efficiency as the filter 600 is an air assisted and electrically powered piece of invention.

There are many novel parts and benefits to the Exhaust air diffuser 300. The diffuser's portability allows for easy to move and maneuver in tight working environments. Vented access panels 305 allow for safe and even distribution of the air upon venting, prevents the build up of backpressure of the venting air and reduces the noise of the venting air. A Dust Drawer with Removable Pan 315 allows for easy clean out of the expansion chamber. A Canvas Dust Bag Diffuser 320 assures quiet, customer friendly discharge of air. An approximately 2" NPT Inlet 325 allows full range of air diffusion from approximately 1" to approximately 2" discharge hoses. A 4"×8" Expansion Chamber 330 allows for rapid dispersing of the air upon entering the Air Diffuser 300. The expansion chamber 330 permits the compressed air that enters the diffuser 300 to expand allowing for a more efficient and safe passage to exit, which reduces the noise of the air upon departure and helps reduce the build up of backpressure of the exiting air from the piping system. The Air Diffuser 300 promotes the rapid unrestricted movement of the compressed air in volumes greater than approximately 1100 CFM and can operate with air pressures greater than approximately 120 PSI. When used in conjunction with the heated, pre-filtered compressed air of the compressor 100, the use of the Air Diffuser 300 creates a more efficient movement of the heated air, which results in a cost savings by drying the pipes faster, drying the epoxy faster, which in turn saves manpower, fuel and reduces the operational time of the compressor 100.

Figure 5A:
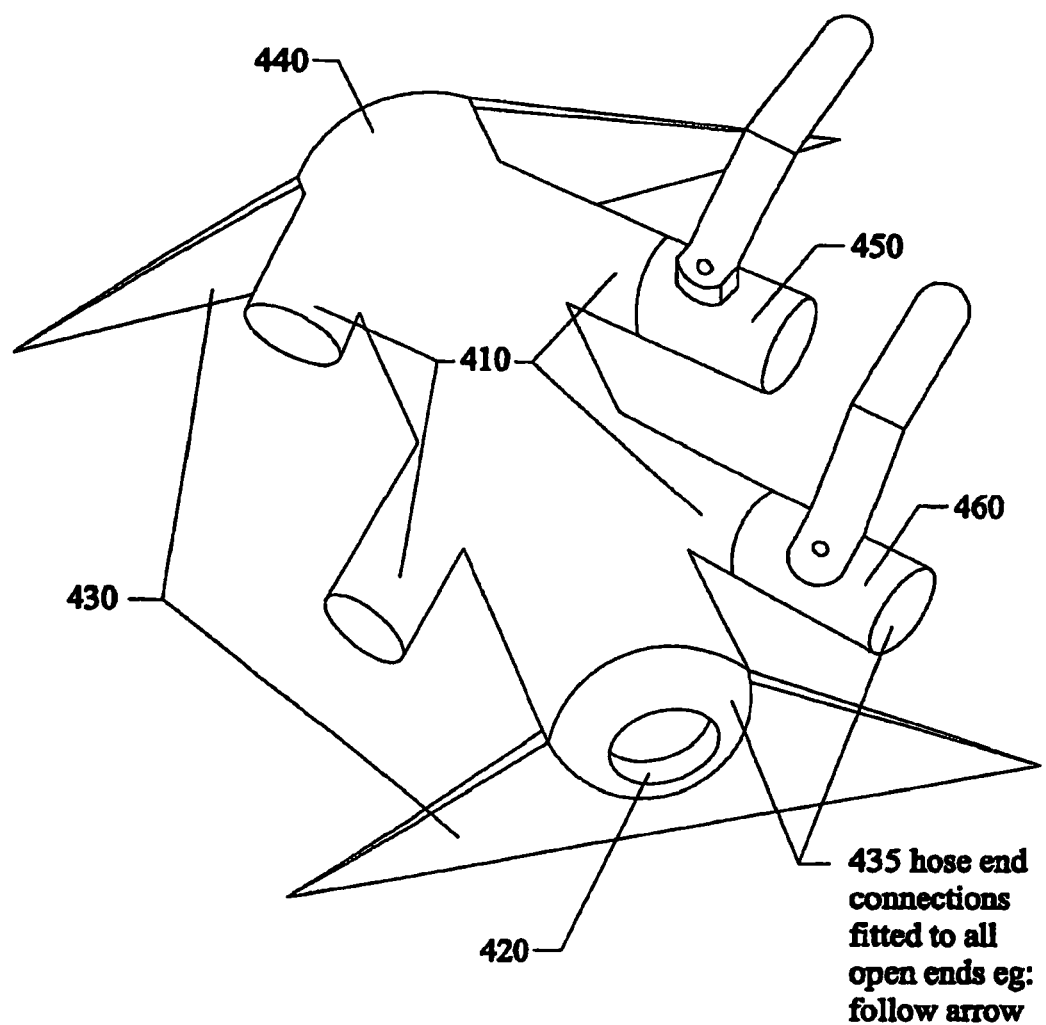
FIG. 5A shows a perspective view of the novel portable air distribution manifold used in the barrier coating control system in FIG. 3.

FIG. 5A shows a preferred portable air distribution manifold 400 that can be used in the exemplary setup shown in FIG. 3
400 Portable Air Distribution Manifold
Referring to FIGS. 3 and 5A, an on off-the-shelf manifold 400 can be one Manufactured By: M & H Machinery 45790 Airport Road, Chilliwack, BC, Canada Description of Manifold 400 Components:
  Main Air Cylinder 2½"×12" Schedule 40 Steel Construction
  Ford Grabber Blue Paint Finishes
  4—1" Welded Nipples Placed at a 45° Angle to the Base Cylinder; Male Threaded 410
  1" NPT Female Threaded Portals at Each End of Cylinder 420
  2 Metal Legs for Support and Elevation of Manifold 430
  Pressure Rated Vessels to 125 PSI or Greater 440
  Attached for Air Control, 1" Full Port Ball Valves NPT; Female Threaded 450
  All Hose End Receptors are NPT 1"; Female Threaded 460

As part of the general air distribution system set up, the floor manifolds 400 can be pressure rated vessels designed to evenly and quietly distribute the compressed air to at least 5 other points of connection, typically being the connections to the piping system. Airflow from each connection at the manifold is controlled by the use of individual full port ball valves.

There are many novel parts and benefits to the Air Manifold 400. The portability of manifold 400 allows for easy to move and maneuver in tight working environments. The elevated legs 430 provide a stable base for unit 400 as well as keep the hose end connections off the floor with sufficient clearance to permit the operator ease of access when having to make the hose end connections. The threaded nipples 410 placed at approximately 45° angle allow for a more efficient use of space and less restriction and constriction of the airline hoses they are attached to. Multiple manifolds 400 can be attached to accommodate more than 5 outlets. The manifolds can be modular and can be used as 1 unit or can be attached to other units and used as more than 1.

FIG. 5B shows a perspective view of the novel pressure generator sander system 500 used in the barrier coating control system in FIG. 3. FIG. 5C shows the front control panel of the sander system.

500 Pressure Generator System-Sander

Referring to FIGS. 3, 5B and 5C, a pressure generator sander 500 that can be used with the invention can be one Manufactured By: Media Blast & Abrasives, Inc. 591 W. Apollo Street Brea, Calif. 92821.

Description of Sander 500 Components:
  12 & 14 Gauge Steel Construction
  Approximate Dimensions: 20" w×24"l×42" h
  Ford Grabber Blue Powder-coating
  1—1" NPT Inlets 505
  1—1" NPT Outlet 510
  3—Air Breather Mufflers 515
  Pop-up Valve gasket 520
  Pop-up Valve 525
  Hand Port Gasket 530
  Pressure Pot with Hand Port and Hopper 535
  Filler Lid with Latches 540
  Mixing Valve 545
  Remote Regulator 550
  Process Valve 555
  Toggle Switch 560
  Air Pressure Gauge 565
  Regulator Adjustment 570
  Pulse Button 580
  Wheel Assembly 585
  2—Inflatable Tires 590

The pressure generating sander system 500 can provide easy loading and controlled dispensing of a wide variety of abrasive medium in amounts up to approximately 1.3 US gallons at a time. The pressure generator sander can include operational controls that allow the operator to easily control the amount of air pressure and control the quantity of the abrasive medium to be dispersed in a single or multiple application. The abrasive medium can be controlled in quantity and type and is introduced into a moving air steam that is connected to a pipe or piping systems that are to be sand blasted clean by the abrasive medium. The sand can be introduced by the pressure generator sander system 500 by being connected to and be located outside of the piping system depicted in FIG. 3. The novel application of the sander system 500 allows for cleaning small pipes having diameters of approximately ⅜" up to approximately 6".

Table 1 shows a list of preferred dry particulate materials with their hardness ratings and grain shapes that can be used with the sand generator 500, and Table 2 shows a list of preferred dry particulate particle sieve sizes that can be used with the invention.

TABLE 1

| PARTICULATES | | |
|---|---|---|
| Material | Hardness Rating | Grain Shape |
| Diamond | 10 | Cubical |
| Aluminium Oxide | 9 | Cubical |
| Silica | 5 | Rounded |
| Garnet | 5 | Rounded |
| Walnut shells | 3 | Cubical |

TABLE 2

| PARTICULATE SIZE SIEVE SIZE OPENING | | | |
|---|---|---|---|
| U.S. Mesh | Inches | Microns | Millimeters |
| 4 | .187 | 4760 | 4.76 |
| 8 | .0937 | 2380 | 2.38 |
| 16 | .0469 | 1190 | 1.19 |
| 25 | .0280 | 710 | .71 |
| 45 | .0138 | 350 | .35 |

There are many novel parts and benefits to the use of the Pressure Generator Sander System 500. The portability allows for easy to move and maneuver in tight working environments. The sander 500 is able to accept a wide variety of abrasive media in a wide variety of media size. Variable air pressure controls 570 in the sander 500 allows for management of air pressures up to approximately 125 PSI. A mixing Valve 545 adjustment allows for setting, controlling and dispensing a wide variety of abrasive media in limited and controlled quantities, allowing the operator precise control over the amount of abrasive medium that can be introduced into the air stream in a single or multiple application. The filler lid 540, incorporated as part of the cabinet and the pressure pot allows the operator to load with ease, controlled amounts of the abrasive medium into the pressure pot 535. The pulse button 580 can be utilized to deliver a single sized quantity of the abrasive material into the air stream or can be operated to deliver a constant stream of abrasive material in to the air stream. All operator controls and hose connections can be centralized for ease of operator use.

FIG. 6A shows a side view of the novel Abrasive Reclaim Separator Module (Pre-Filter) 600 used in the barrier coating control system of FIG. 3. FIG. 6B shows an end view of the novel Abrasive Reclaim Separator Module (Pre-Filter) 600 used in the barrier coating control system of FIG. 3.

600 Abrasive Reclaim Separator Module (Pre-Filter)

Referring to FIGS. 3, 6A and 6B, an off-the-shelf pre-filter that can be used with the invention can be one Manufactured By: Media Blast & Abrasives, Inc. 591 W. Apollo Street Brea, Calif. 92821

Description of Pre-Filter 600 Components:
  12 & 14 Gauge Steel Construction
  Approximate Dimensions: 23"w×22"l×36"h
  Ford Grabber Blue Powder-coating
  Dust Drawer with Removable Pan 610
  2—2" NPT Inlets 620

Approximate Dimensions: 13¼"w×13¼"l×17"h Cyclone Chamber/Separator 630
8" Air and Dust Outlet with Flexible Duct to Air Filter 640
Two Inflatable Tires 650
Push/Pull Handle 660

During the pipe profiling stage, the Pre-Filter 600 allows the filtering of air and debris from the piping system for more than two systems at a time through the 2—approximately 2" NPT inlets 620. The cyclone chamber/separator 630 captures the abrasive material and large debris from the piping system, the by products of the pipe profiling process. The fine dust particles and air escape through the approximately 8" air and dust outlet 640 at the top of the machine and are carried to the dust collection equipment 700, which filters, from the exhausting air, fine particulates, that may not have been captured with the Pre-Filter 600.

There are many novel parts and benefits to the Pre-Filter 600. The pre-filter has portability and is easy to move and maneuver in tight working environments. The Dust Drawer with Removable Pan 610 allows for easy clean out of the abrasive media and debris from the pipe. The Cyclone Chamber/Separator 630 slows and traps the abrasive media and debris from the piping system and air stream, and prevents excess debris from entering into the filtration equipment. The 2—approximately 2" NPT Inlet 620 allows a full range of air filtration from two separate riser or piping systems. Use of the approximately 8" or greater flex tube 640 as an expansion chamber results in reducing the air pressure of the air as it leaves the pre-filter 600 and reduces the potential for back pressure of the air as it departs the pre-filter and enhances the operational performance of the air filter. When used in conjunction with the air filter 700, the Pre-filter 600 provides a novel way of separating large debris from entering the final stage of the filtration process. By filtering out the large debris with the pre-filter 600 this promotes a great efficiency of filtration of fine particles in the final stages of filtration in the air filter 700. The approximately 8" air and dust outlet 640 to the air filter 700 from the pre-filter 600 permits the compressed air to expand, slowing it in velocity before it enters the air filter 700, which enhances the operation of the air filter 700. Process cost savings are gained by the use of the pre-filter 600 by reducing the impact of filtering out the large amounts of debris at the pre-filter stage prior to air entering the air filter 700. This provides for greater operating efficiencies at the air filter 700 a reduction in energy usage and longer life and use of the actual fine air filters 760 used in the air filter 700.

700 Dust Collection Filter

Referring to FIGS. 3, 7A and 7B, an off-the-shelf example if a filter 700 used with the invention can be one Manufactured By: Media Blast & Abrasives, Inc. 591 W. Apollo Street, Brea, Calif. 92821.

Description of Air Filter 700 Components:
12 & 14 Gauge Steel Construction
Approximate Dimensions: 24" w×32" l×65" h
Ford Grabber Blue Powder-coating
Dust Drawer with Removable Pan and Tightening Knobs 705
1¾ NPT Inlet 710
2.0 HP Baldor Motor, Volts 115/230 715
8" Air and Dust Inlet with Flexible Duct to Pre-Filter 720
Ball Vibrator Muffler 725
2—Locking Wheels 730
2—Swivel and Locking Wheels 735
Pushbutton Switch 740
Mushroom Head Switch 745
Selector Switch 750
Tightening Knob 755
2—Corrugated Cartridge Filters, approximately 99.98% Efficient, Collecting 0.5 Micron Particles (based on SAE-J726 test) 760
Cartridge Mounting Rods 765
Cartridge Mounting Plates 770
Filter Tightening Knobs 775
Filter Ball Tightening Knobs 780
Sliding Air Control Exit Vent 785

During the pipe profiling stage, the filter or dust collector 700 is the final stage of the air filtration process. The dust collector 700 filters the passing air of fine dust and debris from the piping system after the contaminated air first passes through the pre-filter 600 (abrasive reclaim separator module). During the epoxy coating drying stage the filter 700 is used to draw air through the piping system, keeping a flow of air running over the epoxy and enhancing its drying characteristics. The filter 700 creates a vacuum in the piping system which is used as method of checking for airflow in the piping system, part of the ACE DuraFlo process. The dust collector 700 can be capable of filtering air in volumes up to approximately 1100 CFM.

There are many novel parts and benefits to the Air Filter 700. The air filter has portability and is easy to move and maneuver in tight working environments. The Dust Drawer with Removable Pan 705 allows for easy clean out of the abrasive media and debris from the filtration chamber. The 8" flexible duct 640 (from FIG. 6A permits the compressed air to expand and slow in velocity prior to entering the dust collector 700, enhancing efficiency. The sliding air control exit vent 785 permits use of a lower amperage motor on start up. The reduced electrical draw enables the dust collector 700 to be used on common household electrical currents while still being able to maintain its capacity to filter up to approximately 1100 CFM of air. The air filter 700 keeps a flow of air running over the epoxy and enhancing its drying and curing characteristics. The dust collector 700 creates a vacuum in the piping system, which is used as method of checking for airflow in the piping system.

800 Portable Epoxy Metering and Dispensing Unit

Referring to FIGS. 3, 8A, 8B and 8C, a metering and dispensing unit 800 used with the invention can be one Manufactured by: Lily Corporation, 240 South Broadway, Aurora, Ill. 60505-4205.

Description of Metering and Dispensing Unit 800 Components:
Aluminum Frame And Cabinet Construction
Approximate Dimensions: 48" L×48" H×22" W
Blue and Black Anodized Finishes
Electrical Powered Space Heating Element and Thermostat 805
Temperature Gauge 810
1—3 Gallon Stainless Steel Pressure Pot for Resin Part A 815
1—3 Gallon Stainless Steel Pressure Pot for Catalyst Part B 820
Pressure Valve For Each Tank 825
Side Door Access Panel 830
Parts and Tool Drawer 835
Aluminum Removable Cover To Access Pressure Pots 840
Adjustable Cycle or Shot Counter 845
4 Wheels—Swivel and Locking 850

Coalescing Air Filter 855
Air Pressure Regulator and Gauge 860
Foot Dispenser Activator 865
Abort Switch 870
On/Off Control Switch 875
Compressed Air Driven Epoxy Meter and Pump Adjustable for Dispensing Up To 14.76 Oz of Mixed Epoxy Per Single Application. Multiple Applications Can Dispense Up To 75 Gallons of Epoxy Per Hour. 880
Threaded Epoxy Mixing Head To Accommodate Disposable Epoxy Mixing Tubes 887 and mixing head 885.
Push/Pull Handle 890
Epoxy Carrying Tube Hanger 895

The Portable Epoxy Metering and Dispensing Unit 800 can store up to approximately 3 US gallons of each of A and B component of the two mix component epoxy, and can dispense single shots up to approximately 14.76 oz, in capacities up to approximately 75 US gallons per hour.

The unit 800 can be very mobile and can be used both indoors and outdoors, and it can operate using a 15 Amp 110 AC electrical service i.e.: regular household current and approximately 9 cubic feet (CFM) at 90 to 130 pounds per square inch. The unit 800 requires only a single operator.

The epoxy used with the unit 800 can be heated using this unit to its recommended temperature for application. The epoxy can be metered to control the amount of epoxy being dispensed.

There are many novel parts and benefits to the Epoxy Metering and Dispensing Unit 800, which include portability and is easy to move and maneuver in tight working environments. The heated and insulted cabinet, all epoxy transit hoses, valves and pumps can be heated within the cabinet. The Top filling pressurized tanks 815 and 820 offers ease and access for refilling. Epoxy can be metered and dispensed accurately in single shot or multiple shots having the dispensing capacity up to approximately 14.76 ounces of material per shot, up to approximately 75 gallons per hour. The position of mixing head 885, permits a single operator to fill the portable epoxy carrying tubes 887 in a single fast application. The drip tray permits any epoxy overspill at the time of filling to be contained in the drip tray, containing the spill and reducing cleanup. The epoxy carrying tube hanger 895 allows the operator to fill and temporarily store filled epoxy tubes, ready for easy distribution. The pump 880 and heater 805 combination allows for the epoxy to metered "on ratio" under a variety of conditions such as changes in the viscosity of the epoxy components which can differ due to temperature changes which effect the flow rates of the epoxy which can differ giving the operator an additional control on placement of the epoxy by changing temperature and flow rates. Unit 800 overall provides greater operator control of the characteristics of the epoxy in the process.

900 Epoxy Barrier Coating

Referring to FIGS. 3 and 8A, 8B and 8C, a preferred epoxy barrier coating that can be used with the invention can be one Manufactured by: CJH, Inc. 2211 Navy Drive, Stockton, Calif. 95206. The barrier coating product used in this process can be a 2-part thermo set resin with a base resin and a base-curing agent.

The preferred thermo set resin is mixed as a two-part epoxy that is used in the invention. When mixed and applied, it forms a durable barrier coating on pipe interior surfaces and other substrates. The barrier coating provides a barrier coating that protects those coated surfaces from the effects caused by the corrosive activities associated with the chemistry of water and other reactive materials on the metal and other substrates.

The epoxy barrier coating can be applied to create a protective barrier coating to pipes ranging in size approximately ⅜" to approximately 6" and greater. The barrier coating can be applied around bends intersections, elbows, t's, to pipes having different diameters and make up. The barrier coating can be applied to pipes in any position e.g.: vertical or horizontal, and can be applied as a protective coating to metal pipes used in fire sprinkler systems and natural gas systems. Up to approximately 4 mils thick coating layers can be formed on the interior walls of the pipes. The barrier coating protects the existing interior walls and can also stop leaks in existing pipes which have small openings and cracks, and the like, of up to approximately ⅜$^{ths}$" in diameters in size.

Although the process of application described in this invention includes application of thermo set resins other types of thermo set resins can be used.

For example, other thermo set resins can be applied in the process, and can vary depending upon viscosity, conditions for application including temperature, diameter of pipe, length of pipe, type of material pipe comprised of, application conditions, potable and non potable water carrying pipes, and based on other conditions and parameters of the piping system being cleaned and coated by the invention.

Other thermo set type resins that can be used include but are not limited to and can be one of many that can be obtained by numerous suppliers such as but not including: Dow Chemical, Huntsmans Advances Material, formerly Ciba Giegy and Resolution Polymers, formerly Shell Chemical.

Although the novel invention can be applied to all types of metal pipes such as but not limited to copper pipes, steel pipes, galvanized pipes, and cast iron pipes, the invention can be applied to pipes made of other materials such as but not limited to plastics, PVC (polyvinyl chloride), composite materials, polybutylene, and the like. Additionally, small cracks and holes in plastic type and metal pipes can also be fixed in place by the barrier coating.

Although the preferred applications for the invention are described with building piping systems, the invention can have other applications such as but not limited to include piping systems for swimming pools, underground pipes, in-slab piping systems, piping under driveways, various liquid transmission lines, tubes contained in heating and cooling units, tubing in radiators, radiant in floor heaters, chillers and heat exchange units, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An on-site method of cleaning and applying a barrier coating in an existing piping system, wherein the piping system includes pipes and fittings selected from at least one of plastics, PVC (polyvinyl chloride), composite materials, polybutylene or combinations thereof, comprising the steps of:
    isolating water supply pipes that carry pressurized water from pipes and fittings selected from at least one of plastics, PVC (polyvinyl chloride), composite materials, polybutylene or combinations thereof in the piping system;

generating and supplying compressed air into the isolated water supply pipes to dry interior walls of the pipes;

introducing a nonliquid cleaning medium into the compressed air;

cleaning interior walls of the water supply pipes with the nonliquid cleaning medium;

applying one single layer of a barrier coating leak sealant with the compressed air in one single pass through run;

providing flowing air over the barrier coating leak sealant applied to the interior walls of the water supply pipes until the initial set of the barrier coating leak sealant is achieved; and restoring the water supply pipes in the piping system selected from at least one of plastics, PVC (polyvinyl chloride), composite materials, polybutylene or combinations thereof to service.

2. The method of claim 1, wherein the applying step includes the step of: applying a layer of at least 4 mils in thickness.

3. The method of claim 1, wherein the pipes have diameters of approximately 3/8 of an inch to approximately 6 inches.

4. The method of claim 1, wherein the restoring step includes the step of: restoring the pressurized water supply pipes to service within approximately 24 to approximately 96 hours.

5. The method of claim 1, further comprising the step of: providing an abrasive medium.

6. The method of claim 1, further comprising the step of: generating a vacuum in another end of the pressurized water supply pipes during the cleaning step.

7. The method of claim 1, further comprising the step of: generating a vacuum in another end of the pressurized water supply pipes during the applying step.

8. The method of claim 7, wherein the generating the vacuum step includes: simultaneously generating the vacuum.

9. An on-site method of cleaning and applying a barrier coating in an existing piping system, wherein the piping system includes pipes selected from at least one of plastics, PVC (polyvinyl chloride), composite materials, polybutylene, comprising the steps of:

isolating water supply pipes that carry pressurized water in the existing piping system;

passing a compressed air stream through the water supply pipes to air dry the interior walls of the pipes;

introducing a nonliquid cleaning medium into the compressed air;

cleaning interior walls of the water supply pipes with the cleaning medium;

applying a barrier coating with the compressed air, to the cleaned interior walls of the water supply pipes in one single pass through run;

providing flowing air over the barrier coating applied to the cleaned interior walls of the pipes with the compressed air until the initial set of the epoxy barrier coating is achieved to stop leaks in the piping system; and restoring the water pipes in the piping system made of plastics, PVC (polyvinyl chloride), composite materials, polybutylene and combinations thereof to service.

10. The method of claim 9, wherein the applying step includes the step of: applying a layer of at least 4 mils in thickness.

11. The method of claim 9, wherein the pipes have diameters of approximately 3/8 of an inch to approximately 6 inches.

12. The method of claim 9, wherein the restoring step includes the step of: restoring the pressurized water supply pipes to service within approximately 24 to approximately 96 hours.

13. The method of claim 9, further comprising the step of: providing sand as the abrasive medium.

14. The method of claim 9, further comprising the step of: generating a vacuum in another end of the water supply pipes during the cleaning step.

15. The method of claim 9, further comprising the step of: generating a vacuum in another end of the water supply pipes during the applying step.

16. The method of claim 9, wherein the cleaning medium includes an abrasive.

17. An on-site method of mixing and applying a barrier coating to stop leaks in an existing piping system, wherein the piping system that includes at least one of plastic, PVC (polyvinyl chloride), composite materials, polybutylene pipes and nonmetal fittings or plastic, PVC (polyvinyl chloride), composite materials, polybutylene pipes and metal fittings, comprising the steps of:

isolating water supply pipes that carry pressurized water in the existing piping system;

generating compressed air into the water supply pipes to dry interior pipe walls;

introducing a nonliquid cleaning medium medium into the generated air;

cleaning interior walls of the water supply pipes with the nonliquid medium;

providing a barrier coating;

applying one single layer of the barrier coating with the compressed air, without dismantling all of the piping system;

stopping leaks and providing an interior barrier for protecting the interior walls of the water supply pipes; and restoring the water supply pipes of the existing piping system that includes at least one of plastics, PVC (polyvinyl chloride), composite materials, polybutylene or combinations thereof to service.

18. The method of claim 17, further comprising the step of:

generating a vacuum in another end of the pressurized water supply pipes during at least one of the cleaning step and the applying step.

19. The method of claim 17, further comprising the step of:

returning the piping system to service within approximately twenty four hours to approximately ninety six hours.

20. The method of claim 17, wherein the cleaning medium includes an abrasive.

* * * * *